US 8,787,331 B2
Jul. 22, 2014

(12) United States Patent
Liu et al.

(10) Patent No.: US 8,787,331 B2
(45) Date of Patent: Jul. 22, 2014

(54) FEMTOCELL LOCAL BREAKOUT MECHANISMS

(75) Inventors: Cheng P Liu, Duluth, GA (US); Alireza Faryar, Fair Haven, NJ (US); Kurt Huber, Coral Springs, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 354 days.

(21) Appl. No.: 12/623,176

(22) Filed: Nov. 20, 2009

(65) Prior Publication Data

US 2010/0128708 A1 May 27, 2010

Related U.S. Application Data

(60) Provisional application No. 61/117,005, filed on Nov. 21, 2008.

(51) Int. Cl.
 H04W 40/00 (2009.01)
 H04W 84/04 (2009.01)
(52) U.S. Cl.
 CPC .................................. H04W 84/045 (2013.01)
 USPC ....................................................... 370/338
(58) Field of Classification Search
 None
 See application file for complete search history.

(56) References Cited

U.S. PATENT DOCUMENTS

| | | | |
|---|---|---|---|
| 2002/0181395 A1 | 12/2002 | Foster et al. | |
| 2002/0191595 A1 | 12/2002 | Mar et al. | |
| 2003/0054795 A1 | 3/2003 | Tamaki et al. | |
| 2004/0125937 A1 | 7/2004 | Turcan et al. | |
| 2006/0250578 A1* | 11/2006 | Pohl et al. | 351/210 |
| 2008/0207170 A1* | 8/2008 | Khetawat et al. | 455/411 |
| 2009/0046074 A1 | 2/2009 | Shneidman et al. | |
| 2009/0061821 A1 | 3/2009 | Chen et al. | |
| 2009/0098890 A1 | 4/2009 | Vasudevan et al. | |
| 2009/0100492 A1 | 4/2009 | Hicks et al. | |
| 2009/0168766 A1 | 7/2009 | Eyuboglu et al. | |
| 2009/0268668 A1* | 10/2009 | Tinnakornsrisuphap et al. | 370/328 |
| 2009/0285176 A1 | 11/2009 | Zheng et al. | |
| 2009/0311987 A1 | 12/2009 | Edge et al. | |
| 2010/0056144 A1 | 3/2010 | Gallagher et al. | |
| 2011/0038318 A1* | 2/2011 | Parsons et al. | 370/328 |

OTHER PUBLICATIONS

OA dated Mar. 1, 2012 for U.S. Appl. No. 12/623,210, 19 pages.
OA dated Mar. 1, 2012 for U.S. Appl. No. 12/623,223, 15 pages.
OA dated Jul. 31, 2012 for U.S. Appl. No. 12/623,210, 25 pages.
OA dated Jul. 9, 2012 for U.S. Appl. No. 12/623,223, 29 pages.

(Continued)

Primary Examiner — John Blanton
Assistant Examiner — Alan Lindenbaum
(74) Attorney, Agent, or Firm — Amin, Turocy & Watson, LLP

(57) ABSTRACT

A system and methodology that employs local breakout mechanisms at a femto access point (FAP) to facilitate efficient utilization of backhaul and/or macro networks is provided. In particular, a slave Gateway GPRS Support Node (GGSN) can be integrated within the FAP to directly route the incoming traffic from a user equipment (UE) at the FAP. In one example, Internet bound traffic can be directly routed to the Internet, without employing macro network resources. Further, the system can avoid hairpinning by routing traffic between the UE and a home Local Area Network (LAN) by a anchoring a call or a session in the slave GGSN and facilitate integration of UEs with home applications by employing a UE Digital Home Agent. In addition, the FAP can perform UE-to-UE CS media breakout to facilitate communication between UEs attached to the FAP, without routing the traffic through the core macro network.

20 Claims, 16 Drawing Sheets

(56) References Cited

OTHER PUBLICATIONS

OA dated Jun. 26, 2012 for U.S. Appl. No. 12/623,237, 29 pages.
OA dated Mar. 19, 2013 for U.S. Appl. No. 12/623,210, 28 pages.
OA dated Feb. 1, 2013 for U.S. Appl. No. 12/623,237, 29 pages.
Office Action dated Oct. 30, 2013 for U.S. Appl. No. 12/623,210, 27 pages.
Office Action dated Dec. 30, 2013 for U.S. Appl. No. 12/623,237, 28 pages.

* cited by examiner

FEMTOCELL LOCAL BREAKOUT MECHANISMS

CROSS-REFERENCE TO RELATED APPLICATIONS

This application claims the benefit of U.S. Provisional Patent Application Ser. No. 61/117,005, filed on Nov. 21, 2008, and entitled "FEMTO CELL LOCAL BREAKOUT MECHANISMS". This application is also related to co-pending U.S. patent application Ser. No. 12/623,210, filed on Nov. 20, 2009, entitled "HOME SERVICE INTEGRATION AND MANAGEMENT BY EMPLOYING LOCAL BREAKOUT MECHANISMS IN A FEMTOCELL", co-pending U.S. patent application Ser. No. 12/623,223, filed on Nov. 20, 2009, entitled "SERVICE CONTINUITY DURING LOCAL BREAKOUT IN A FEMTOCELL", and co-pending U.S. patent application Ser. No. 12/623,237, filed on Nov. 20, 2009, entitled "FEMTOCELL LOCAL BREAKOUT MANAGEMENT SERVICES". The entireties of each of the foregoing applications are incorporated herein by reference.

TECHNICAL FIELD

The subject disclosure relates to wireless communications and, more particularly, to employing local breakout mechanisms at a femto access point.

BACKGROUND

Femtocells—building-based wireless access points interfaced with a wired broadband network—are traditionally deployed to improve indoor wireless coverage, and to offload traffic from a mobility radio access network (RAN) operated by a wireless service provider. Improved indoor coverage includes stronger signal, increased bandwidth, and improved reception (e.g., video, sound, or data), ease of session or call initiation, and session or call retention, as well. Offloading traffic from a RAN reduces operational and transport costs for the service provider since a lesser number of end users consumes macro RAN over-the-air radio resources (e.g., radio traffic channels), which are typically limited. With the rapid increase in utilization of communications networks and/or devices, mobile data communications have been continually evolving due to increasing requirements of workforce mobility, and, services provided by femtocells can be extended beyond indoor coverage enhancement.

Conventional systems that employ femtocells, transport information (e.g., data and/or voice) from a user equipment (UE) including Internet bound traffic through a landline network to a mobility core network. The information is received at the mobility core network and the Internet bound data can be identified and routed to the Internet from the core network. This hairpin type of traffic routing can lead to significant network resource utilization and can cause congestion in the landline network and/or mobility core network. Further, since data sent by the UE is routed to the Internet from the mobility core network only after traversing through the landline network, the response time is substantially high.

Traditional femtocells transport UE traffic to the mobile service provider network (e.g., core network) via a home broadband service (Digital subscriber line (DSL), Cable, Fiber, etc.). During UE-to-UE communication, the traffic is directed from one UE to another via the core network, even when both the UEs are attached to the femtocell. Accordingly, bandwidth utilization in the traditional approach is inefficient and can negatively impact performance and customer satisfaction.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate local breakout mechanisms at a femto access point (FAP) to reduce backhaul and/or macro network congestion. Moreover, a slave Gateway GPRS Support Node (GGSN) can be integrated within the FAP to directly route the incoming traffic from a user equipment (UE) at the FAP. In one example, Internet bound traffic can be directly routed to the Internet via a Digital home (DH) Local Area Network (LAN). In another example, traffic bound to a locally connected UE, can be directly routed to the UE from the FAP, without routing the traffic through the core macro network.

In accordance with another aspect of the system, a routing component can analyze the received packet to determine an optimal path for the packet from the FAP. Moreover, the routing component can determine a destination address, source address, type of packet, type of protocol associated with the packet, and/or one or more user defined rules or policies and/or user preferences, etc. Based in part on the determined information, the routing component can compute the optimal path to transfer the received packet, such that, network bandwidth is efficiently utilized. In one aspect, the routing component can determine an optimal route for a received packet by employing load-balancing techniques, to avoid network congestion. Additionally or alternately, the routing component can employ one or more machine learning techniques to facilitate efficient network and/or resource utilization. Further, the routing component can also perform a cost-benefit analysis to determine an optimal route associated with minimal billing charges.

Yet another aspect of the disclosed subject matter relates to a method that can be employed to facilitate local breakout mechanisms at a FAP to improve network performance and response times. The method comprises receiving a packet at the FAP, from a UE. Further, an analysis is performed on the received packet to determine information associated with routing of the packet (e.g., source address, destination address, etc.). Furthermore, a route can be determined for transferring the packet from the FAP based in part on the analysis, Policy Decision/Policy Enforcement Functions (PDF/PEF) specified by a service provider, user defined rules or policies, and/or user preferences. Accordingly, the packet can be routed via the determined route.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
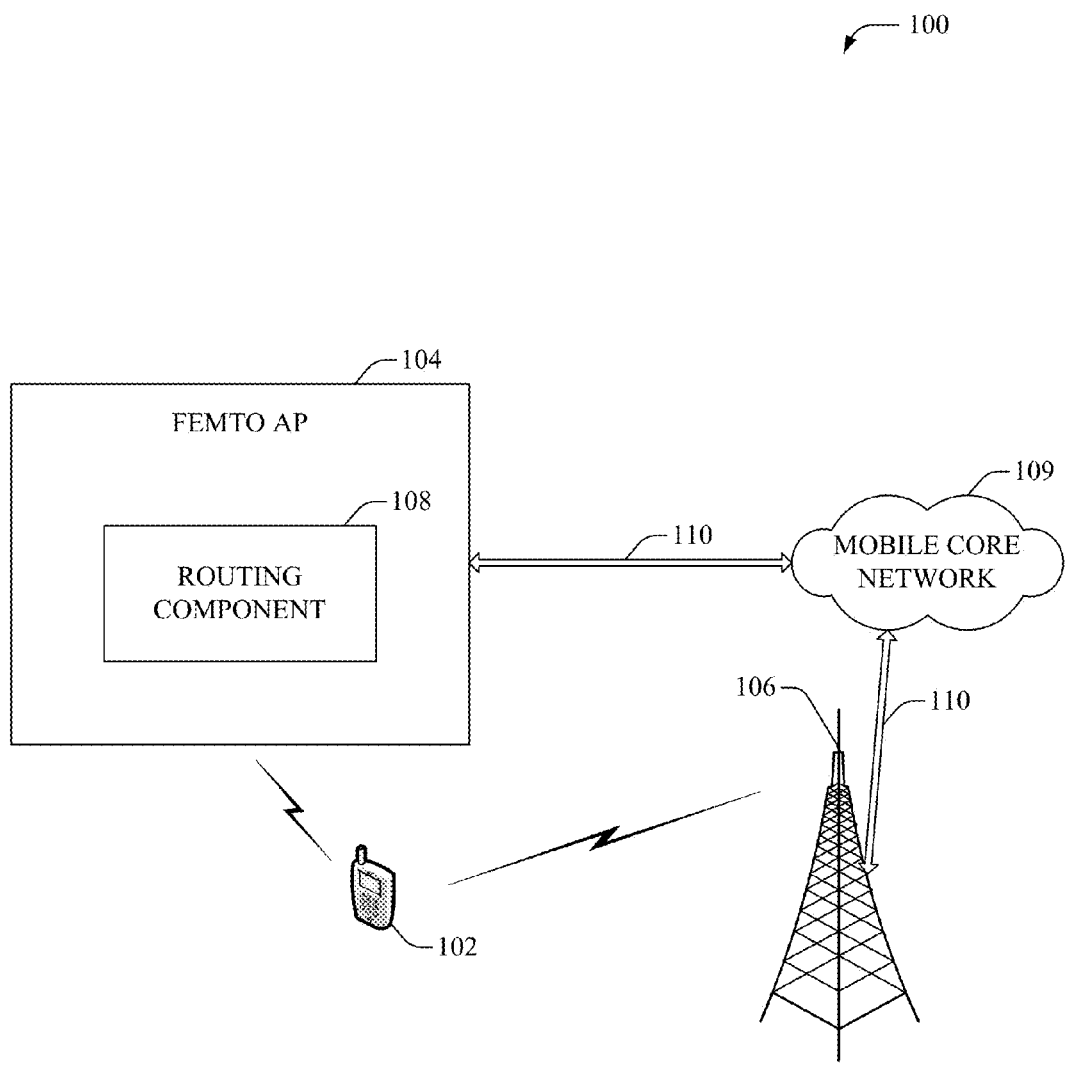
FIG. 1 illustrates an example system that facilitates efficient utilization of network bandwidth during wireless communication in a femtocell.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," "agent," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. Additionally, the terms "femtocell network", and "femto network" are utilized interchangeably, while "macro cell network" and "macro network" are utilized interchangeably herein. Further, the terms "core network", "mobility core network", "mobile core network", "core mobility network", "core mobile network" and "mobility network" are utilized interchangeably herein.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "femtocell access point", "femtocell" and "femto access point" are also utilized interchangeably.

Systems and methods disclosed herein employ local breakout mechanisms at a femto access point (AP) that can reduce network congestion in a macro RAN and/or a backhaul network connected to the femto AP. In one aspect, a local broadband network (e.g., Digital Subscriber Line network) can facilitate access to the Internet and accordingly the Internet bound data received at the femto AP can be directly routed to the Internet by breaking out the traffic at the femto AP. Thus, network congestion on the backhaul pipe and/or the macro RAN can be significantly reduced. Further, since for example, Internet bound data is not transmitted through the core macro network, faster response and improved performance can be achieved for the end user.

Additionally, the disclosed systems & methods enable a UE, attached to a femtocell, for example, in a home, to initiate direct communication with an application within the home (e.g., on a home network), without hairpinning the traffic from the femtocell in the home network to the core network and back to the home network. Similarly, a home based application communicating with the UE, can initiate communication via a femto access point without traffic hairpinning.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates efficient utilization of network bandwidth during wireless communication in a femtocell, according to an aspect of the subject disclosure. In one embodiment, a user equipment (UE) 102, can be located within a coverage area of a femto access point (FAP) 104 and can attach to the FAP 104 by employing most any attachment procedure. Typically, the UE 102 as disclosed herein can include most any communication device employed by a subscriber, such as, but not limited to, a cellular phone, a personal digital assistant (PDA), a laptop, a personal computer, a media player, a gaming console, and the like. Moreover, the UE 102 can access the mobile core network 109 through femto network via FAP 104 and/or via base station 106. It can be appreciated that the macro core network 109 can include most any radio environment, such as, but not limited to, Universal Mobile Telecommunications System (UMTS), Global System for Mobile communications (GSM), LTE, WiMAX, CDMA, etc. The signaling and bearer technologies, for example circuit switched (CS), and/or packet switched (PS), in a femtocell and macro cell can be the same or different, depending on the radio technologies involved.

Typically, traffic flows between the FAP 104 and mobile core network 109 and/or between the base station 106 and mobile core network 109 through a broadband backhaul 110 (e.g., optical fiber based technologies (e.g., Ethernet, DS3, etc.), twisted-pair line based technologies (e.g., DSL, T1/E1 phone line, etc.), or coaxial cable based technologies (e.g., DOCSIS, etc.). The FAP 104 generally can rely on the broadband backhaul 110 for signaling, routing and paging, and for packet communication. According to an embodiment, the FAP 104 can include a routing component 108 that can be utilized to facilitate efficient management of traffic to and/or from the FAP 104.

In one example, the routing component 108 can include a slave Gateway GPRS Support Node (GGSN). Typically, the slave GGSN can implement a subset of functionality implemented by a GGSN in the core network 109. For example, a routing functionality can be implemented by the slave GGSN to perform local breakout at the FAP 104. In addition, the slave GGSN can enable anchoring of a communication session at the routing component 108 rather than the core network GGSN. In one aspect, the routing component 108 can receive traffic (e.g., voice, data, media, etc.) from the UE 102 and/or from the base station 106 (e.g., via the broadband backhaul 110), analyze the received information and determine a route for the received traffic. According to one embodiment, the routing component 108 can selectively route UE traffic away from an Iuh tunnel and send the traffic to a residential/enterprise local IP network destination, for example, via a home network, Local Area Network (LAN), and/or a broadband access network (e.g., Internet) (not shown).

For example, the routing component can receive communication packets sent by UE 102 connected to the FAP 104 and can determine information associated with the received packet that can facilitate routing of the packet from the FAP 104 via the slave GGSN. As an example, the routing component 108 can check a header associated with the received packet and determine a destination address. Based in part on the determined destination address, the routing component 108 can compute an optimal route to transfer the received packet, such that, network bandwidth is efficiently utilized. Moreover, the routing component 108 can facilitate route determination based in part on a destination address, source address, type of packet, type of protocol, one or more user and/or service provider defined rules or policies and/or user preferences. Additionally, the routing component 108 can utilize load balancing mechanisms, machine learning techniques, and/or a cost benefit analysis to generate a route for the received packets.

Typically, a femto gateway (not shown) can aggregate regional traffic received from multiple FAPs and tunnel the traffic to the core network 109. The conventional circuit switched (CS) traffic can be routed to a Mobile Switching Center (MSC) and the packet switched (PS) traffic can be routed to a Serving GPRS Support Node (SGSN) and Gateway GPRS Support Node (GGSN). According to an aspect, the routing component 108 can facilitate communication between UE 102 and a device on a home network (not shown) by directly routing information between the UE 102 and the home network (e.g., without routing the traffic through the core network 109). Accordingly, the UE 102 can communicate with the home device over a home LAN when UE 102 is attached to the FAP 104. It can be appreciated that when UE 102 detaches from the FAP 104, the core network 109 can maintain a connection to the UE 102 via the mobility network (e.g., through base station 106). Similarly, routing component 108 can route Internet bound traffic, received from the UE 102, directly to the Internet, for example, via the home LAN.

In particular, the routing component 108 can examine traffic sourced in the UE 102 to separate home bound, broadband access network bound and/or Internet bound traffic from the rest. A network address translation (NAT) can be performed to proxy the Internet Protocol (IP) address of UE 102 assigned by mobile core with a home network domain IP address. The routing component 108 can then send the IP traffic over the home LAN. Similarly, the routing component 108 can examine traffic that sources in the home network and is destined to the UE 102. A NAT can be performed to proxy the home domain IP address with the IP address of the UE 102. Accordingly, the routing component 108 can deliver the traffic from the home LAN to the UE 102.

Additionally, routing component 108 can achieve UE-to-UE CS breakout traffic. Moreover, the routing component 108 can facilitate directly routing communication between two or more UEs connected to the FAP 104, without utilizing the broadband backhaul 110. The routing performed at the FAP 104 can substantially save network capital investments, time and resources through lowered duplicity and/or increment of the network infrastructure. Further, the quality on customer applications can be improved and a faster response time can be achieved.

Figure 2:
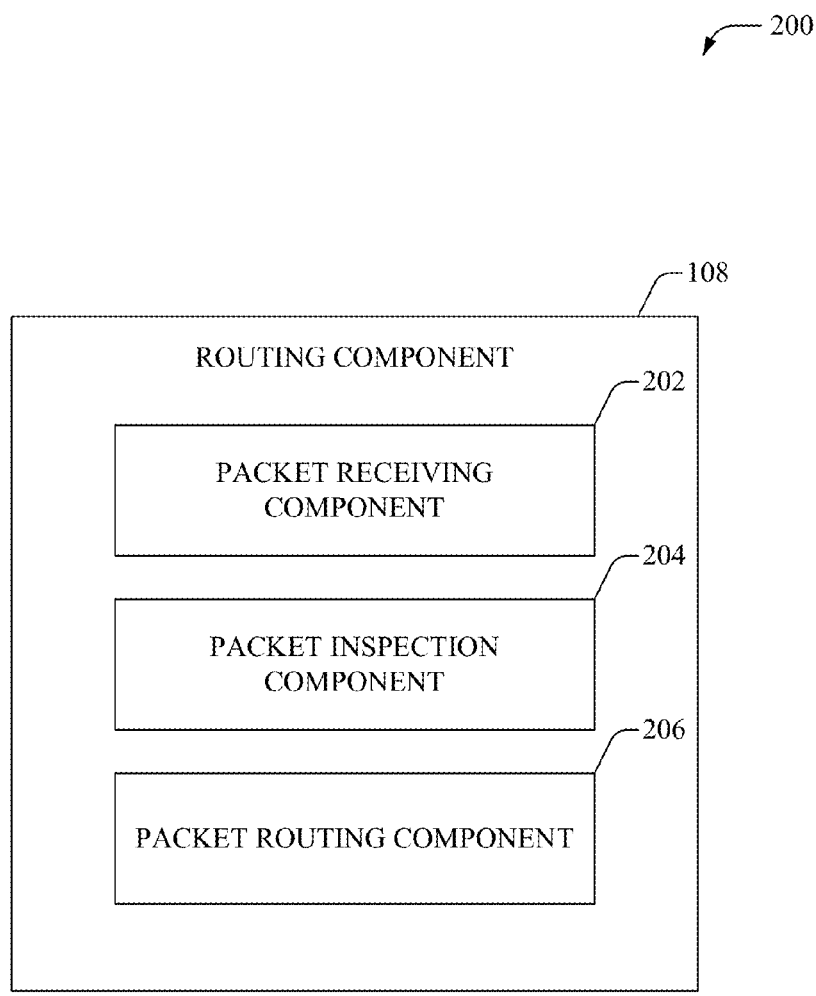
FIG. 2 illustrates an example system that can be employed to facilitate local breakout mechanisms that efficiently utilize network bandwidth and/or resources associated with a backhaul pipe and/or a macro RAN.

FIG. 2 illustrates an example system 200 that can be employed to facilitate local breakout mechanisms that efficiently utilize network bandwidth and/or resources associated with a backhaul pipe and/or a macro RAN, in accordance with an aspect of the disclosure. It can be appreciated that the routing component 108 can include functionality, as more fully described herein, for example, with regard to system 100.

In one aspect, the system 200 comprises a routing component 108, which can typically include a packet receiving component 202 that can be employed to receive information, such as, but not limited to data, voice, media, control data and/or a combination thereof, from a UE and Femto Gateway. Typically, the UE can include most any electronic device that can connect wirelessly to a FAP 104, such as, but not limited to, mobile phones, media players, digital cameras, media recorders, laptops, PDAs (personal digital assistants), personal computers, printers, scanners, digital photo frames, GPS module, gaming module, etc. Further, it can be appreciated the UE can be mobile, stationary, and/or have limited mobility and can employed, for example, in a home, office, building, retail store, restaurant, hotel, factory, warehouse, etc.

In one aspect, the packet receiving component 202 can be employed to receive communication packets sent by one of the multiple registered UEs connected to the femto AP. Additionally, packet receiving component 202 can receive communication packets, through a home/enterprise network and/or macro network. Specifically, the femtocell can be connected to the home/enterprise network by most any registration process. According to an embodiment, a packet inspection component 204 can be employed to analyze information associated with the received packet to facilitate routing of the packet from the femto AP. In one aspect, the packet inspection component 204 can determine a destination address associated with the received packet, for example, by checking an IP header associated with the received packet. Accordingly, the packet inspection component 204 can generate an optimal route to transfer the received packet, based in part on the determined destination address, such that, network bandwidth is efficiently utilized.

It can be appreciated that the packet inspection component 204 can employ most any analysis technique to determine routing of a received packet, such as, but not limited to, routing based in part on a destination address, source address, type of packet, type of protocol, one or more user and/or service provider defined rules or policies and/or user preferences. According to an example, the packet inspection component 204 can determine an optimal route for a received packet, to avoid network congestion. Additionally or alternately, the packet inspection component 204 can employ load-balancing techniques to facilitate efficient network and/or resource utilization. In one aspect, the packet inspection component 204 can utilize one or more machine learning techniques to facilitate automating one or more features in accordance with the subject innovation, as discussed in detail infra with respect to FIG. 7.

The routing component 108 can further include a packet routing component 206 that can be employed to route a received packet based on the route determined by the packet inspection component 204. Moreover, the routing can include, routing PS traffic between UEs attached to the femtocell, between a UE and a home device, between a UE and the Internet via the home network, between a UE and the macro network, and/or between a home device and the macro network via a backhaul network. It can be appreciated that a NAT can be performed when routing the packets from one network to another.

Figure 3:
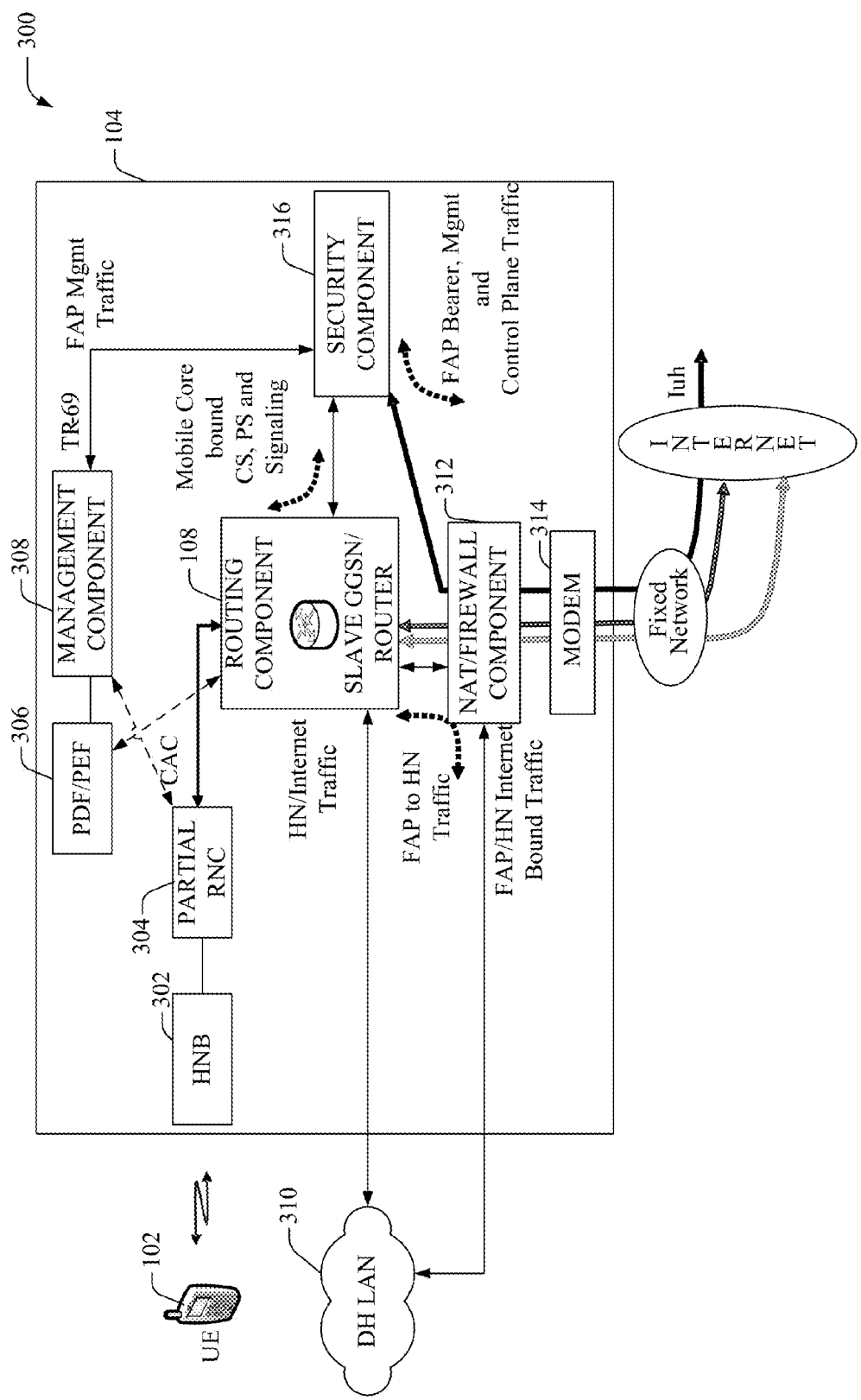
FIG. 3 illustrates an example system that can be employed to facilitate efficient routing of traffic within a femtocell.

Referring now to FIG. 3, there illustrated is an example system 300 that can be employed to facilitate efficient routing of traffic within a femtocell, according to an aspect of the subject disclosure. It can be appreciated that the UE 102, FAP 104, and routing component 108 can include respective functionality, as more fully described herein, for example, with regard to systems 100 and 200. Moreover, system 300 includes a FAP 104 that can be integrated with an integrated residential gateway (RG). Further, FAP 104 can be connected to a LAN, for example digital home (DH) LAN 310, by a wireless and/or wired connection. It can be appreciated that the DH LAN 310 disclosed herein, can be most any LAN and can be deployed in most any area, such as but not limited to, a house, an office, a building, a warehouse, a store, a restaurant, a hotel, a factory, etc.

Typically, the FAP 104 can receive communications from a UE 102. The UE 102 can be most any communication device employed by a user, for example, a cellular phone, a gaming module, a television, a projector, personal computer, etc. Moreover, the UE 102 can utilize various technologies for terrestrial wireless communication, for example, an advanced second generation (2.5G) telecommunication technology such as Enhanced Data Rate for Global System for Mobile Communications (GSM) Evolution (EDGE); a third generation technology (3G) like Third Generation Partnership Project (3GPP) Universal Mobile Telecommunication System (UMTS), a 3GPP2 Evolution Data Only (EVDO) system, 3GPP Long Term Evolution (LTE), or Ultra-broadband Mobility (UMB); advanced 3G such as Worldwide Interoperability for Microwave Access (WiMax); or a fourth generation (4G) technology such as for example Long Term Evolution (LTE) Advanced. Additionally, a UE 102 can consume satellite-based traffic such as data originated from GPS, GLONNAS, or Galileo systems, conveyed through a deep-space link (not shown).

In one aspect, the Home Node B (HNB) 302 can receive communication from the UE 102 and can perform Node-B radio functions such as, but not limited to scheduling. Further, a partial Radio network control (RNC) 304 can be employed to perform Radio Resource Control (RRC), radio bearer (RB)/radio access bearers (RABs), radio access network (RAN) quality of service (QoS), call admission control (CAC)/Power/Congestion control, and the like. In accordance with an aspect, a routing component 108 can (e.g., by employing a packet inspection component 204) locally break out Internet and/or Home Network bound traffic. In one aspect, the routing component 108 can include a slave GGSN. Moreover, information packets received from the UE 102 can be analyzed by the routing component 108 and a route to transfer the packets can be determined (e.g., by employing a packet inspection component 204). In one example, the routing can be based in part on a destination address, source address, type of packet, type of protocol, one or more user and/or service provider defined rules or policies and/or user preferences.

According to an embodiment, a Policy Decision/Policy Enforcement Function (PDF/PEF) 306 can be employed to drive the selection of the route. The PDF/PEF 306 can include multiple policies that can be specified, for example, by a service provider through a management component 308. The management component 308 can be employed to facilitate FAP management (FAP white list, policy rule updates, Ethernet/IP port management, FAP firmware updates, GSN routing function management, performance and alarm status update etc.). Additionally, the management component 308 can employ Technical Report 069 (TR-69) protocol to communicate with a Femto provisioning/management platform in the mobility network. According to an aspect, when a customer installs the FAP 104, during setup (or at any other time), the management component 308 can facilitate authentication of the FAP 104 with the mobility network, such that, the service provider can recognize the FAP 104 and can ensure that the customer and/or the FAP 104 is legitimate. Further, once the customer and/or FAP 104 are authenticated, the management component 308 can download configuration information (e.g., service provider policies, rules, definitions) and parameters that can facilitate connection with the core network elements (e.g., GGSN).

In one embodiment, the management component 308 can provide an interface that enables a mobility network operator/service provider/mobility network element to control the local breakout mechanism, for example, by specifying policies in the PDF/PEF. In one example, the management component 308 can also provide mobility network operator/service provider/mobility network element with an override functionality. Moreover, the mobility network operator/service provider/mobility network element can utilize the override functionality to stop local breakout at most any time and/or for a specified time period. Specifically, the override functionality can be employed by a service provide upon legal request and/or for security purposes. For example, a legal/security request can be made (e.g., by a government agency) to monitor communication through a particular FAP and the service provider can utilize the management component 308 to override the breakout mechanisms employed at the FAP, such that all communication at the FAP can be transferred via the mobility network. Moreover, the management component 308, in response to the override command, can disable breakout functionality at the routing component 108 and/or create a policy, which ensures that local breakout is not performed at the FAP 104.

The routing component 108, based in part on factors, such as but not limited to, the analysis, the PDF/PEF, etc., identifies an optimal route for traffic received at the FAP 104. In one example, when traffic is received from the UE 102, the routing component 108 can identify whether the traffic should be routed to the macro network, via the Iu tunnel, to the Internet via the DH LAN 310, a device on the DH LAN 310 and/or a disparate UE (not shown) attached to the FAP 104. Based on the determination, the routing component can deliver the traffic via the identified route. In another example, the routing component 108 can receive traffic from the device on the DH LAN 310 and can determine an optimal route (e.g., to UE 102, or macro network, etc.) for the traffic, for example, by employing one or more policies in the PDF/PEF 306, and route the traffic via the optimal route.

Additionally or alternately, a Network address translation (NAT)/Firewall component 312 (e.g., IPv4) can be employed to modify network address information in packet headers that can be routed via the backhaul network and/or the home network. Typically, the RG can provision the femtocell with an IP address when the femtocell attaches to the home network, for example DH LAN 310. When the routing component 108 determines that the traffic (e.g., from UE 102) can be routed to the DH LAN 310, the NAT/Firewall component 312 can employ a NAT function to replace the IP address of UE 102 in a packet header, with a home network domain IP address associated with the DH LAN 310. Similarly, when the routing component 108 determines that the traffic (e.g., from DH LAN 310) can be routed to the UE 102, the NAT/Firewall component 312 can utilize a NAT function to replace the home domain IP address with the IP address of the UE 102.

Further, the NAT/Firewall component 312 can employ a firewall for intrusion detection and/or prevention for UE 102 to home/enterprise network traffic and vice versa. Furthermore, the firewall can allow or prevent a device on the DH LAN 310 to access the mobility network through the Iuh tunnel. In one aspect, the NAT/firewall component 312 can utilize one or more policies from the PDF/PEF 306 to control access of the mobility network by the device on the DH LAN 310. For example, the firewall can protect the digital home network and prohibit bridging the DH LAN 310 with the Internet through the mobility core network. It can be appreciated that the firewall can be hardware, software, or a combination thereof. In one example, a modem 314 (a DSL or most any broadband modem) can be employed for transmission of packets through the backhaul network to the macro RAN. Furthermore, the FAP 104 can include a security component 316 that can utilize most any encryption technique for secure channel set up and/or tear down and/or encryption of outbound traffic. For example, the security component can perform encryption for establishing the Iu tunnel.

Figure 4:
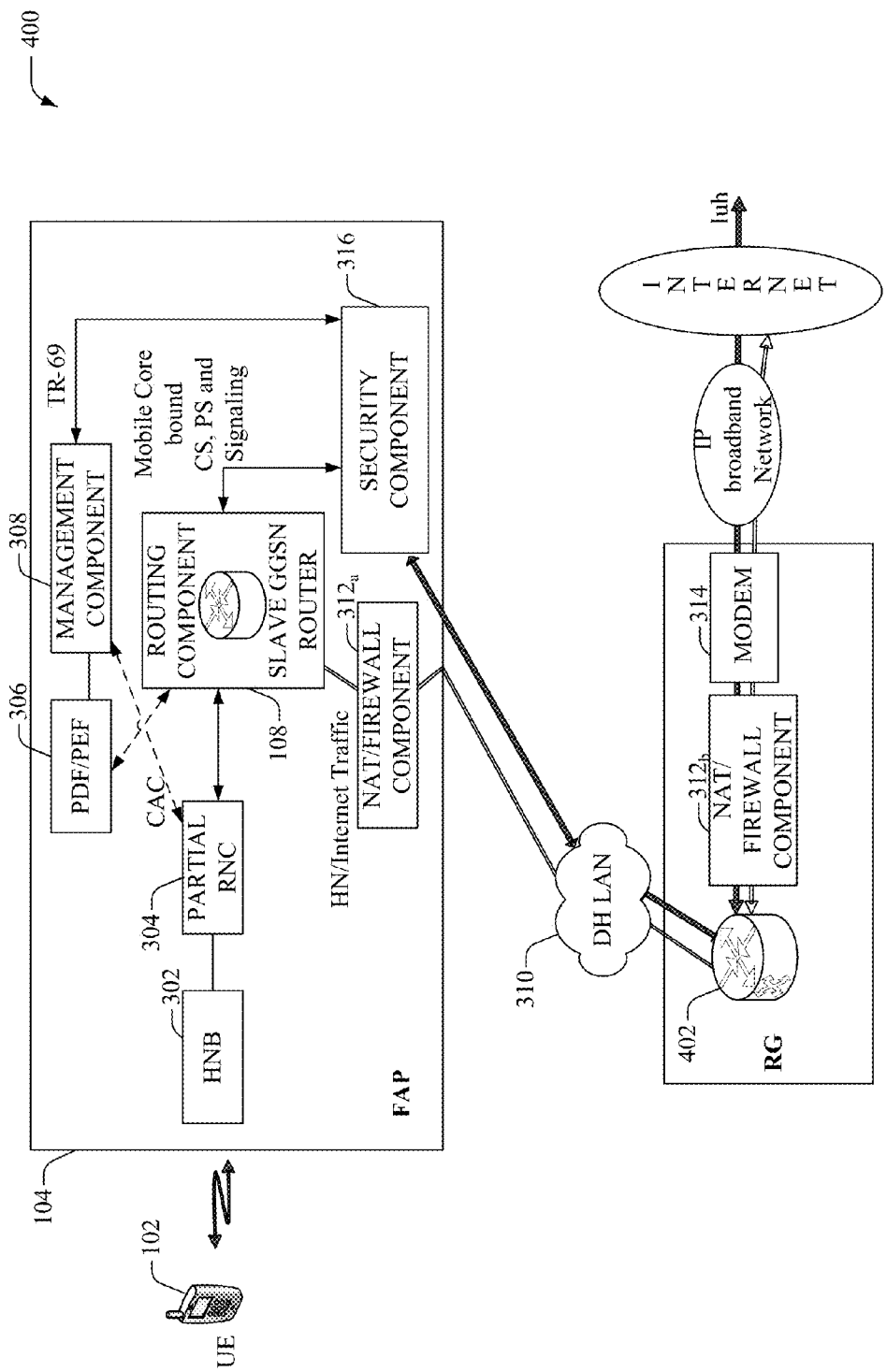
FIG. 4 illustrates an example a Digital Home (DH) femtocell architecture wherein a residential gateway (RG) can be externally connected to a femto access point (AP).

Referring to FIG. 4, there illustrated is an example a DH femtocell architecture 400 wherein a RG 402 is externally connected to a FAP 104, according to an aspect of the subject specification. It can be appreciated that the routing component 108, UE 102, HNB 302, Partial RNC 304, PDF/PEF 306, management component 308, security component 316, DH LAN 310, modem 314, and FAP 104 can include functionality, as more fully described herein, for example, with regard to system 100, 200 and 300. Typically, the RG 402 can be integrated within the FAP 104, as shown in FIG. 3 or can be externally connected to the FAP 104, as shown in FIG. 4 according to an aspect of the subject disclosure. However, it can be appreciated that the working and implementation of systems 300 and 400 can be substantially similar.

As discussed previously, the routing component can route traffic between UE 102 and the DH LAN 310, UE 102 and the Internet via DH LAN 310, UE 102 and a disparate UE attached to the FAP 104, and/or UE 102 and the macro network. According to an aspect, a NAT/Firewall component $312_a$ can be employed to facilitate network address mapping for information in packet headers that are routed via the backhaul network and/or the home network. Typically, the NAT/Firewall component $312_a$ can employ a NAT function to replace the IP address of UE 102 in a packet header with a home network domain IP address associated with the DH LAN 310. Similarly, when the routing component 108 determines that the traffic (e.g., from DH LAN 310) can be routed to the UE 102, the NAT/Firewall component $312_a$ can employ a NAT function to replace the home domain IP address with the IP address of the UE 102. Further, the NAT/Firewall component $312_b$ can employ a firewall for intrusion detection and/or prevention. For example, the firewall can prevent bridging the DH LAN 310 with the Internet through the mobility core network. It can be appreciated that the firewall can be hardware, software, or a combination thereof. In one aspect, a RG 402 can be utilized to direct traffic to the mobility network through the backhaul network backbone.

Figure 5:
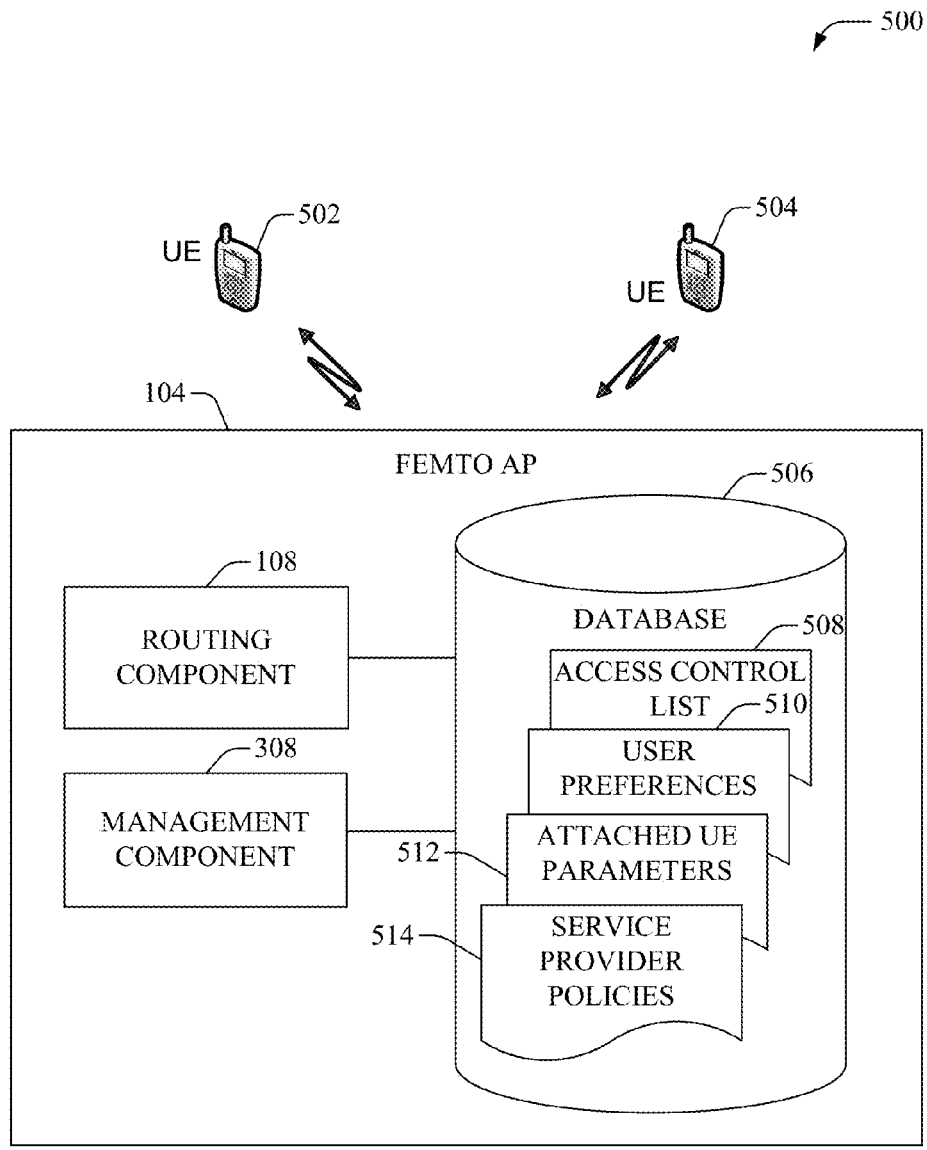
FIG. 5 illustrates an example system that facilitates user equipment (UE)-to-UE circuit switched (CS) media breakout within a femtocell.

Referring to FIG. 5, there illustrated is an example system 500 that facilitates UE-to-UE CS media breakout within a femtocell in accordance with an aspect of the subject disclosure. It can be appreciated that the routing component 108, management component 308 and FAP 104 can include functionality, as more fully described herein, for example, with regard to system 100, 200, 300 and 400.

One or more UEs (502, 504) can attach to the FAP 104 when the UEs (502, 504) are within the coverage area of the FAP 104, for example, by employing most any attachment procedure. It can be appreciated that the FAP 104 can utilize an authentication and/or authorization technique to prevent unauthorized attachments. For example, the FAP 104 can manage access to femtocell services through access control list(s) 508, e.g., white list(s) or black list(s). Such access control list(s) 508 can be configured through various apparatuses and in various modes, e.g., interactively or automatically, which facilitates access management of access to femtocell coverage. As an example, white list(s) includes a set of UE(s) identifier numbers, codes or tokens, and can also include additional fields that can contain information respectively associated with communication devices to facilitate femtocell access management based at least in part on desired complexity; for example, an additional field in a white list can be a logic parameter that determines whether an associated identifier is available for dissemination across disparate white lists. Values of attribute fields that determine white list(s), black list(s), or white list profile(s) can be generated through various sources. The management component 308 can facilitate generation and maintenance of white list(s), black list(s), or white list profile(s).

In addition, the management component 308 can be employed to create, update and/or delete information that facilitates routing and/or authentication, which can be stored in database 506. Although database 506 is shown to reside within the FAP 104, it can be appreciated that database 506 can be a local, a remote, and/or a distributed database. The database 506 can be employed to store information such as, but not limited to, access control list 508, user preferences 510, attached UE parameters 512 and/or service provider policies 514. The service provider policies 514 can typically include one or more policies associated with routing and/or breakout at the FAP 104. In addition, the service provider policies 514 can include the PDF/PEF that can drive the selection of an optimal route, for example, by the routing component 108. Further, the attached UE parameters 512 can provide a list of currently attached UEs (502, 504) and can typically include information (e.g., device ID, SIM, USIM, a mobile number, etc.) associated with the UEs (502, 504) that are currently attached to the FAP 104.

In one example, when UE 502 initiates a call, the routing component 108 can analyze the CS traffic from the UE 502 and determine an optimal path to route the call. As an example, the routing component 108 can analyze information stored in the database 506, such as, but not limited to user preferences 510, attached UE parameters 512 and/or service provider policies 514, to determine the optimal path. In one aspect, the routing component 108 can verify whether the destination device for the CS call is attached to the FAP 104, for example, by employing information from the attached UE parameters 512. When the routing component 108 determines that the destination entity is not attached to the FAP 104, the routing component 108 can direct the call to the macro network via the backhaul network. Alternately, when the routing component 108 determines that the destination entity is attached to the FAP 104, for example, if the destination entity is UE 504, the routing component 108 can facilitate CS media breakout at the FAP 104 and facilitate communication between the UE 502 and UE 504 without routing the call through the macro network. It can be appreciated that when one of or both the UEs move out of the femtocell coverage area, service continuity can be established and the call can be routed via the macro network. Further, it can be appreciated that the routing component can transmit data indicating the CS media breakout to the core mobility network (e.g., that can be utilized for billing and/or records, etc.)

It can be appreciated that the database 506 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 6:
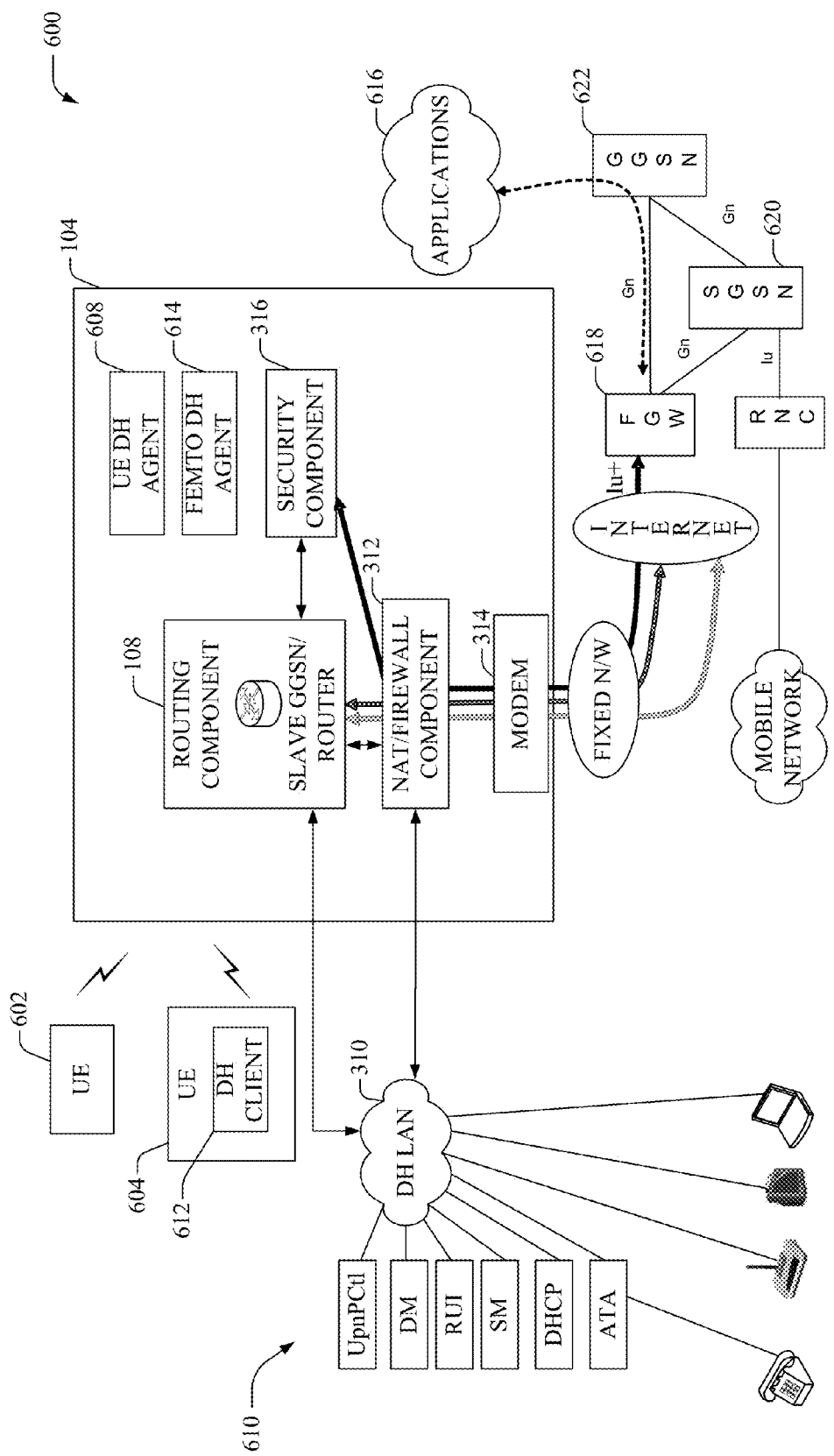
FIG. 6 illustrates an example system that provides home services integration with a femtocell, according to an aspect of the subject disclosure.

FIG. 6 illustrates an example system 600 that provides home services integration with a femtocell, according to an aspect of the subject disclosure. Typically, system 600 can include a FAP 104 that can comprise an integrated (as shown in FIG. 3) or external RG (as shown in FIG. 4). It can be appreciated that the routing component 108, NAT/Firewall component 312, modem 314, security component 316, and FAP 104 can include functionality, as more fully described herein, for example, with regard to system 100, 200, 300, 400 and 500. Additionally, it can be appreciated that FAP 104 can include components (e.g., HNB, partial RNC, management component, PDF/PEF, etc.) as illustrated in FIGS. 3-4 and described herein with respect to systems 300 and 400.

According to an embodiment, the routing component 108 can facilitate communication between a UE (602, 604) and one or more devices 606 on the DH LAN 310. Typically, device 606 can be most any device on the DH LAN 310, such as, but not limited to, a telephone, a printer, a laptop, an appliance, a television, a projector, a gaming module, music player, etc. Thus, the UE (602, 604) can join the LAN (e.g., home network), without supporting a dual mode wireless/Wi-Fi functionality. In addition, the routing component 108 can directly route Internet bound packets to the Internet, without transferring the packets to the core network. Further, the routing component 108 can identify communication directed to a device on the LAN and route the communication directly to the destination via the DH LAN 310.

According to an embodiment, the FAP 104 can include a UE DH agent 608 that can facilitate communication between UE 602 and a device 606 on the DH LAN 310. In one aspect, the UE DH agent 608 can identify when a UE 602 attaches to the FAP 104 and can communicate the presence of the UE 602 to the DH functions. Similarly, the UE DH agent 608 can identify when the UE 602 leaves the femtocell and accordingly communicate the absence of the UE 602 to the DH functions. Moreover, the UE DH agent 608 can perform mapping to provide DH functions to the UE 602. Specifically, the UE DH agent 608 can make the UE 602 appear as a DH compliant device in the DH LAN 310.

According to one aspect, the UE DH agent 608 can render an application-specific User Interface (UI) on a display on the UE 602. As an example, a user can interact with the displayed UI and communicate with and/or control the devices on the DH LAN 310. For example, the UE DH agent 608 can render a webpage, which can include information and/or interactive buttons, which enable the user to monitor and/or control devices 606. Further, the UE DH agent 608 can provide a coherent UI across all UEs attached to the FAP 104. Moreover, the UE DH Agent 608 can be a DH compliant agent working together with DH application(s) to interface the UE 602 with various DH functions and services 610. In one example, the FAP 104 can instantiate one UE DH Agent 608 for each UE 602 that attaches to the FAP 104, except for those which are not authorized to access DH services. Specifically, a femtocell Access Control List (ACL) can be maintained by the DH Agent 608 (e.g., by employing information stored in database 506) to authorize the UE 602 for DH access. In an alternate embodiment, the ACL can be maintained by a management function (e.g., management component 308) within the FAP 104 and accessed by the DH Agent 608, for UE 602 authorization. In one example, a UI (e.g., web page) through which the femto AP owner can add and/or delete UE IDs to/from the Femtocell ACL can be provided by the UE DH agent 608. The entries to the ACL can include information, such as, but not limited to, an ID known to the femto AP owner and the user of the visiting UE 602 (e.g. telephone number). In one example, the network provider can remotely view and/or modify the ACL.

In accordance with an aspect, the UE DH agent 608 can provide an authorized UE with DH services 610, such as, but not limited to, Digital Rights management (DRM), Remote User Interface (RUI), Dynamic Host Configuration Protocol (DHCP), session management (SM), Universal Plug and Play (UPnP), Analog Terminal Adapter (ATA). Moreover, the UE DH Agent 608 can offload traffic to the broadband access network. For example, UE traffic to/from the Internet can be routed directly to the Internet service provider (ISP) and the DH LAN 310, and can bypass the GSN. Accordingly, the UE DH agent 608 can route signaling and/or media to and/or from the DH LAN 310 in an efficient manner, avoiding hairpinning (e.g., tromboning). In an additional aspect, the UE DH agent 608 can facilitate session continuity for traffic between the UE 602 and select DH LAN services 610 and/or devices 606, when the UE 602 moves from the femtocell to the macro cell and vise versa.

It can be appreciated that the UE DH agent 608 can be located within the femtocell and/or can be located within a UE, for example the DH client 612 in UE 604. In particular, the DH client 612 can include functionality substantially similar to that of the UE DH agent 608. Moreover, the DH Client 612 can be a device-specific Digital Home compliant client, residing in the UE, for delivering DH services to the UE. It can be appreciated that although only one DH client 612 is illustrated in UE 614, one or more DH clients may reside in a UE, each with the same or different functionality. In one aspect, the DH Client 612 can enhance user experience beyond that which can be provided with the UE DH Agent 608, for example, based on UE specifications and/or user preferences.

Further, the FAP 104 can include a femto DH Agent 614 that can be employed to authenticate the FAP 104 with the home network. For example, the femto DH Agent 614 can facilitate attaching, detaching and establishing its presence in the DH LAN 310. In addition, the femto DH Agent 614 can facilitate wireline and/or wireless convergence by inter-working between the DH functions 610 and mobile applications 616 (e.g., mobility/CARTS functions). For example, the femto DH Agent 614 can facilitate location assisted cellular services by obtaining location of the FAP 104 from a function, application, database, and/or device attached to the DH LAN 310 and providing it to the mobility location servers. Additionally or alternately, the femto DH Agent 614 can assist a mobile core charging function for measuring Internet traffic breakout at the FAP 104. Further, the femto DH Agent 614 can provide traffic breakout information to a service provider billing system (not shown).

As described previously, the NAT/Firewall component 312 can be employed to modify network address information in packet headers that are routed to/from the UE (602, 604) via the backhaul network and/or the DH LAN 310. Further, the NAT/Firewall component 312 can employ a firewall for intrusion detection/prevention and/or for protecting the DH LAN 310 and prohibiting bridging of the DH LAN 310 with the Internet through the mobility core network. The security component 316 can encrypt traffic to the macro RAN to create the Iu tunnel. Further, in one example, a DSL network can be employed, by the FAP 104, as the transport media to connect to the femto gateway (FGW) 618 located at the edge of the mobility core network. The conventional Iu traffic consisting of the Circuit Switched (Iu-cs) voice traffic and Packet Switched (Iu-ps) data traffic together with Femto signaling can be transported between the Femtocell and Femto Gateway in a secure channel. The Iu over IP protocol can be referred to as Iu+.

In order to facilitate a fast radio link layer control, functions of conventional RNC can be split between and integrated into FAP 104 and femto gateway 618. Functions such as radio bearer management and radio QoS management can be included in the FAP 104 (e.g., by employing partial RNC 304); and functions of GPRS Tunneling Protocol (GTP) tunnel management, femtocell authentication, mobility management and/or handover control can be integrated into the FGW 618. In one example, the FGW 618 can aggregate regional femtocells' traffic and tunnel the traffic to the core network. The conventional circuit switched (CS) traffic is routed to a Mobile Switching Center (MSC) and the packet switched (PS) traffic is routed to a Serving GPRS Support Node (SGSN) 620 and Gateway GPRS Support Node (GGSN) 622.

The UE (602, 604) can activate one or more Packet Data Protocol (PDP) context with the GGSN 622. Typically, up to three PDP contexts can be active at the same time. The primary PDP Context can be employed for signaling and best effort traffic. The other two secondary PDP contexts can each be dedicated for data stream with a particular quality of service. However, the system 600 can break the PDP context, such that, a subset of functions of the GGSN 622 can be performed by the routing component 108. Accordingly, communication sessions can be anchored at the routing component 108 instead of core network GGSN 622.

Figure 7:
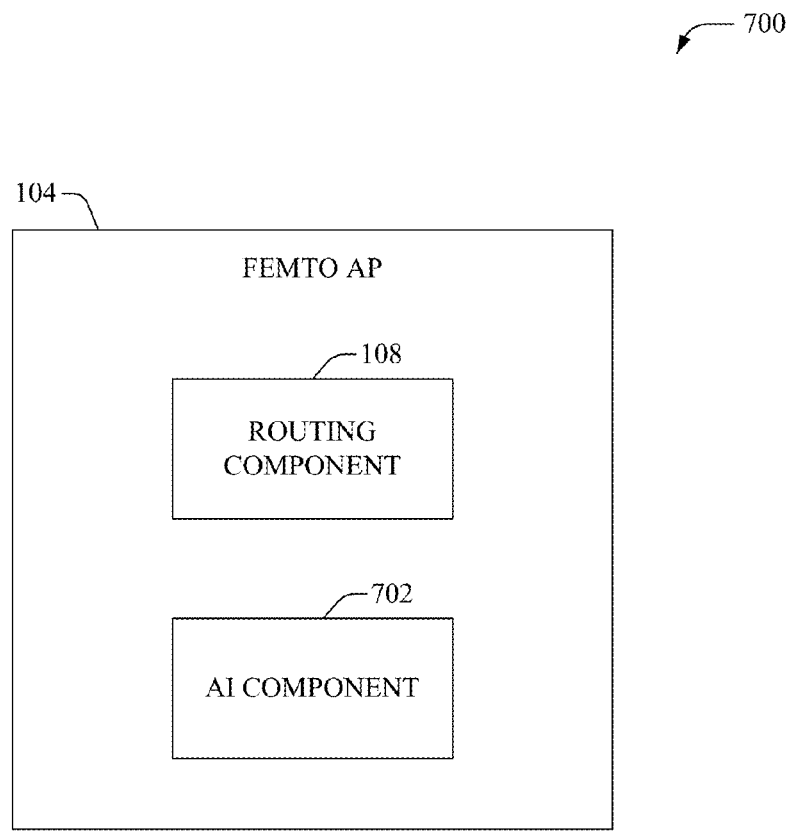
FIG. 7 illustrates an example system that facilitates automating one or more features in accordance with the subject innovation.

FIG. 7 illustrates an example system 700 that employs an artificial intelligence (AI) component 702, which facilitates automating one or more features in accordance with the subject innovation. It can be appreciated that the FAP 104 and the routing component 108 can include respective functionality, as more fully described herein, for example, with regard to systems 100-600.

The subject innovation (e.g., in connection with routing) can employ various AI-based schemes for carrying out various aspects thereof. For example, a process for optimal route determination by the routing component 108 can be facilitated via an automatic classifier system and process. Moreover, where the routing component 108 can facilitate local breakout at the FAP 104, the classifier can be employed to determine how the received traffic can be routed.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information within the packet headers or other data-specific attributes derived from the information within the packet headers, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria whether the received traffic can directly be routed to a home network (e.g., DH LAN 310), whether the received traffic can directly be routed to a disparate UE attached to the femtocell, whether the received traffic can be routed through the macro RAN, whether the received traffic can directly be routed to Internet, etc. The criteria can include, but is not limited to, the amount of traffic received, the type of traffic received, the importance (e.g., priority) of the traffic received, historical patterns, UE behavior, user preferences, service provider preferences and/or policies, femto AP parameters, etc.

FIGS. 8-11 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
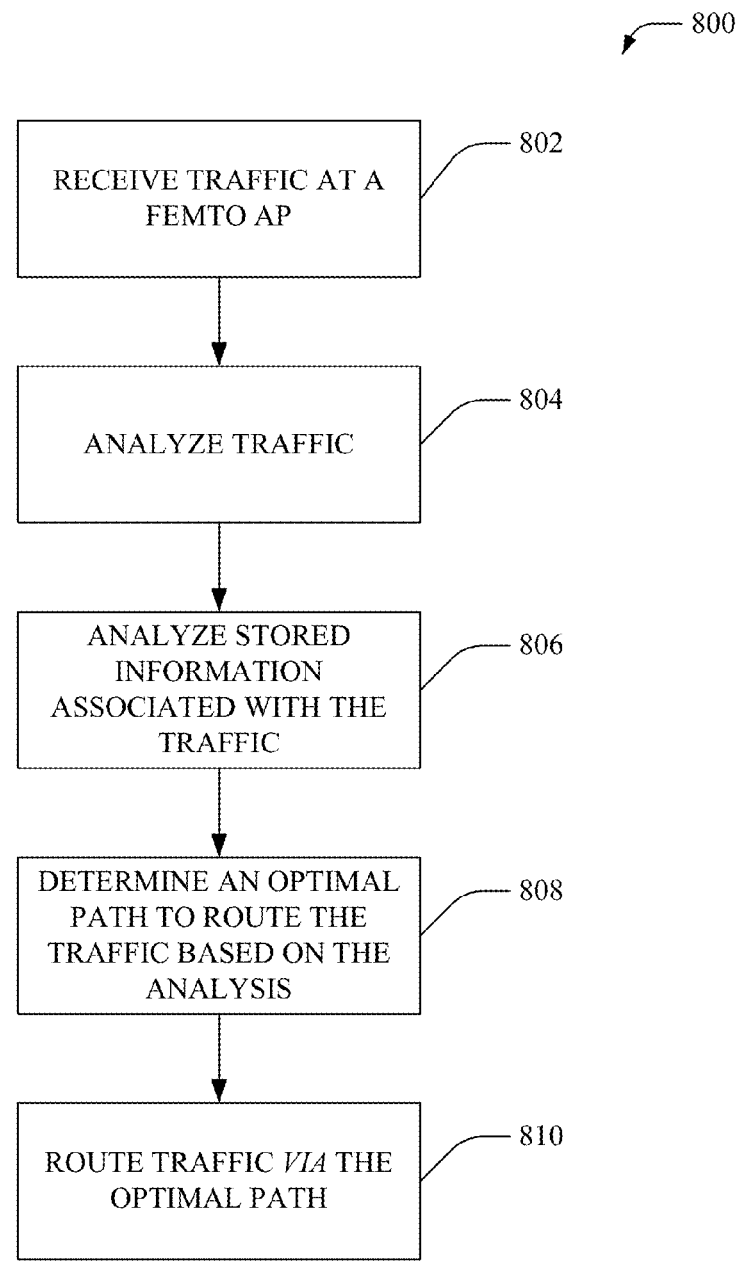
FIG. 8 illustrates an example methodology that can efficiently utilize backhaul network bandwidth and macro network resources.

Referring now to FIG. 8, illustrated is an example methodology 800 that can efficiently utilize backhaul network bandwidth and macro network resources in accordance with an aspect of the subject innovation. In particular, methodology 800 can facilitate routing of traffic (e.g., voice, data, media, etc.) at a femto AP and perform local breakout at the femto AP. In one aspect, the femto AP can be connected to a LAN, such as, but not limited to a DH LAN. At 802, traffic can be received at the femto AP. For example, the traffic can be received from one or more UEs attached to the femto AP and/or a device on the LAN, for example, via the LAN.

At 804, the received traffic can be analyzed. In one aspect, a destination address, a source address, type of packet, type of protocol associated with the traffic can be determined. At 806, additional information associated with the traffic, for example, information stored in a database can be analyzed. The information can include, but is not limited to, user preferences, UE parameters, femto AP parameters, service provider policies, PDF and/or PEF, etc. At 808, an optimal path can be determined to route the traffic based in part on the analysis. As an example, it can be determined whether local breakout at the femto AP is possible and the traffic can be directly routed to its destination from the femto AP, without employing macro network resources. At 810, the traffic can be routed via the optimal path. In one example, traffic from a UE can directly be routed to the Internet, without routing the traffic to the core mobility network.

Figure 9:
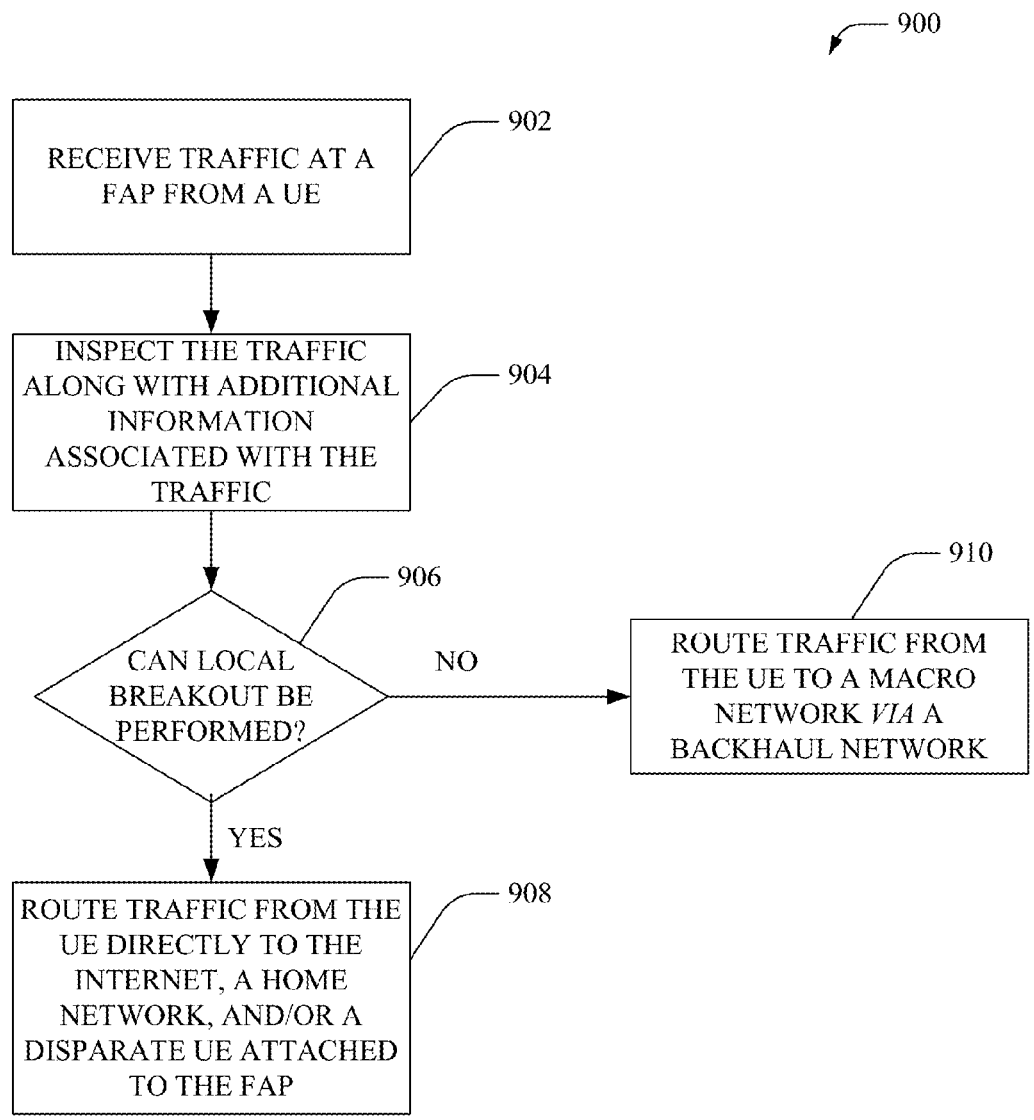
FIG. 9 illustrates an example methodology that facilitates local breakout at a femto AP.

FIG. 9 illustrates an example methodology 900 that facilitates local breakout mechanisms at a femto AP, according to an aspect of the subject disclosure. In one aspect, an authorized UE located within a coverage area of a femto access point (FAP) can attach to the FAP by employing most any attachment procedure. Typically, the UE can include, but is not limited to, a cellular phone, a personal digital assistant (PDA), a laptop, a personal computer, a media player, a gaming console, and the like. Once attached to the femto AP, the UE can communicate, for example, with the macro network via the femto AP. At 902, traffic can be received at the femto AP from the UE. It can be appreciated that traffic can include data, such as, but not limited to, audio, video, multimedia, data, etc. Further, the femto AP can be connected to a LAN, such as a home network.

At 904, the received traffic along with additional information associated with the traffic can be inspected. In one example, a destination address associated with a received packet can be determined, for example, by checking a header of the received packet. Additionally or alternately, information such as, but not limited to, a source address, type of packet, type of protocol can also be determined by inspecting the received traffic. Further, a database can be queried to determine information associated with the received traffic, such as but not limited to, an ACL, user preferences, attached UE parameters, femto AP parameters, service provider policies and/or preferences, PDFs and/or PEFs, etc. At 906, it can be determined whether local breakout can be performed, based in part on an analysis of the determined information. As an example, the determination of performing local breakout can be based on several additional factors, such as, but not limited to, network congestion control, load-balancing techniques, cost benefit analysis and/or machine learning techniques.

If determined that local break out cannot be performed, at 910, the traffic received from the UE can be directed to a macro network (e.g., core network GGSN) via a backhaul network. Alternately, at 908, the traffic received from the UE can be directly routed from the femto AP to its destination, when determined that local breakout can be performed. For example, the traffic from the UE can be routed from the femto AP directly to a disparate UE attached to the femto AP, a device on the home network, or the Internet.

Figure 10:
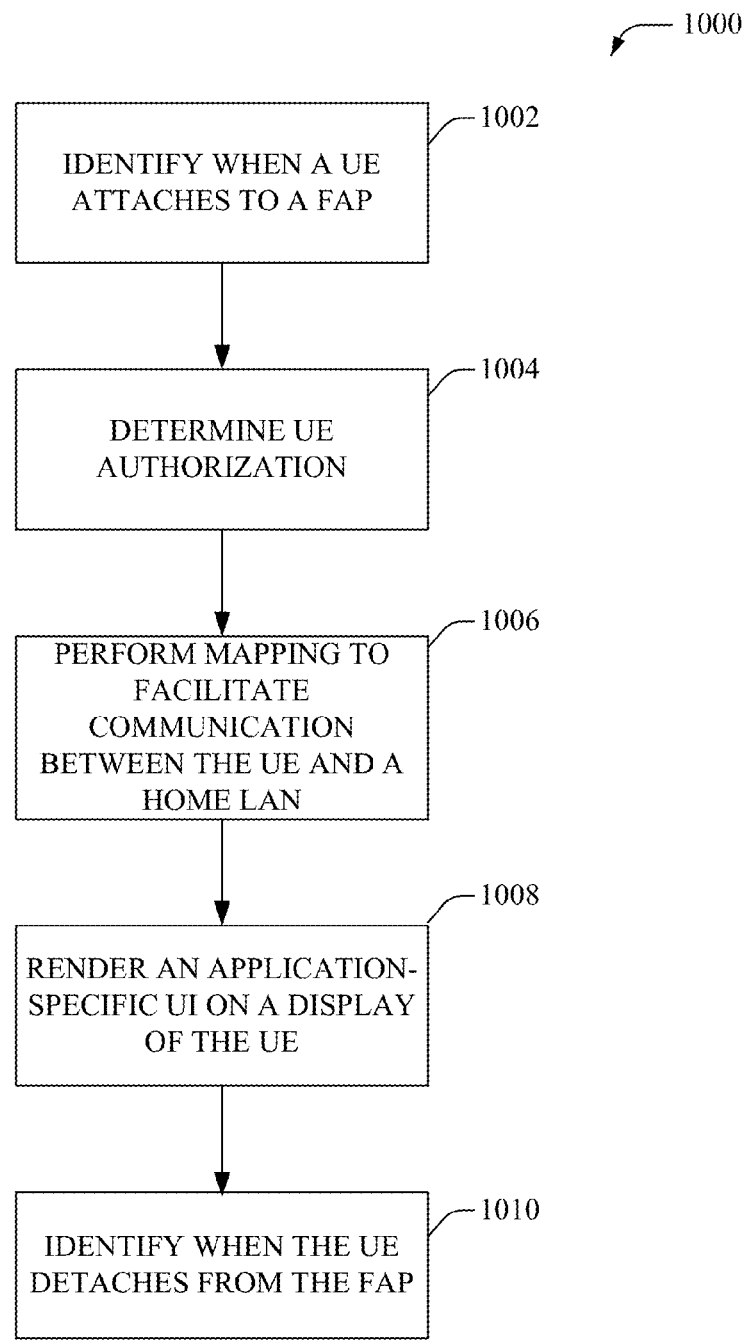
FIG. 10 illustrates an example methodology that facilitates home application integration with a femto AP in accordance with an aspect of the subject disclosure.

FIG. 10 illustrates an example methodology 1000 that facilitates home application integration with a femto AP in accordance with an aspect of the subject disclosure. The methodology 1000 enables a UE, attached to the femto AP to communicate with a home device over the home LAN. In contrast with conventional methodologies wherein traffic from a UE to an application within the home, is hairpinned from the home network to the service provider network and back to the home network, methodology 1000 facilitates directly routing traffic received from the UE to the home network, at the femto AP. In one aspect, when the UE leaves the femtocell, a connection between the UE and the home device can be maintained by the mobility network.

At 1002, a UE attachment with the femto AP can be identified. In one example, this information can be communicated to the home LAN, such that the home network services, applications and/or devices are aware of the UEs currently attached to the femto AP. At 1004, UE authorization can be determined. In particular, most any authorization and/or authentication techniques can be employed to determine whether the UE is authorized to access the home LAN. As an example, the service provider and/or the femto AP owner can create and/or modify a list of authorized user and store the list at the femto AP. For example, the femto AP owner can restrict access to the home LAN to UEs associated with family members. At 1006, mapping can be performed to facilitate communication between the authorized UE and a device, service and/or application on the home LAN. Specifically, the mapping can provide interworking between different protocols utilized by the UE and by the device, service and/or application on the home LAN In addition, NAT can be employed during communication wherein the UE IP address can be replaced with a home LAN domain IP address and IP traffic from the UE can be routed to the destination device, service and/or application over the home LAN. Similarly, when the traffic sources from the device, service and/or application in the home LAN and is destined to a UE attached to the femto AP, the traffic can be routed to the UE based on the home domain IP address for the UE, maintained in the femtocell. Moreover, the home domain IP address can be replaced with the UE IP address and traffic from the home LAN can be routed to the UE.

At 1008, an application-specific UI can be rendered on a display of the UE. As an example, a user can interact with the displayed UI and communicate with and/or control the devices on the home LAN. For example, a webpage can be rendered in a browser of the UE that can allow a user to monitor, control and/or communicate with a home device/application/service. Moreover, the UE can be interfaced with various home LAN functions and services, such as but not limited to, Digital Rights Management (DRM), Remote User Interface (RUI), Dynamic Host Configuration Protocol (DHCP), session management (SM), Universal Plug and Play (UPnP), Analog Terminal Adapter (ATA), etc. Further, at 1010, the detachment of a UE from the femto AP can be identified. Moreover, this information can be conveyed to the home LAN. In one aspect, communication between the UE and a device, service and/or application on the home LAN can be seamlessly handed over from the femtocell to the macro cell to provide service continuity.

Figure 11:
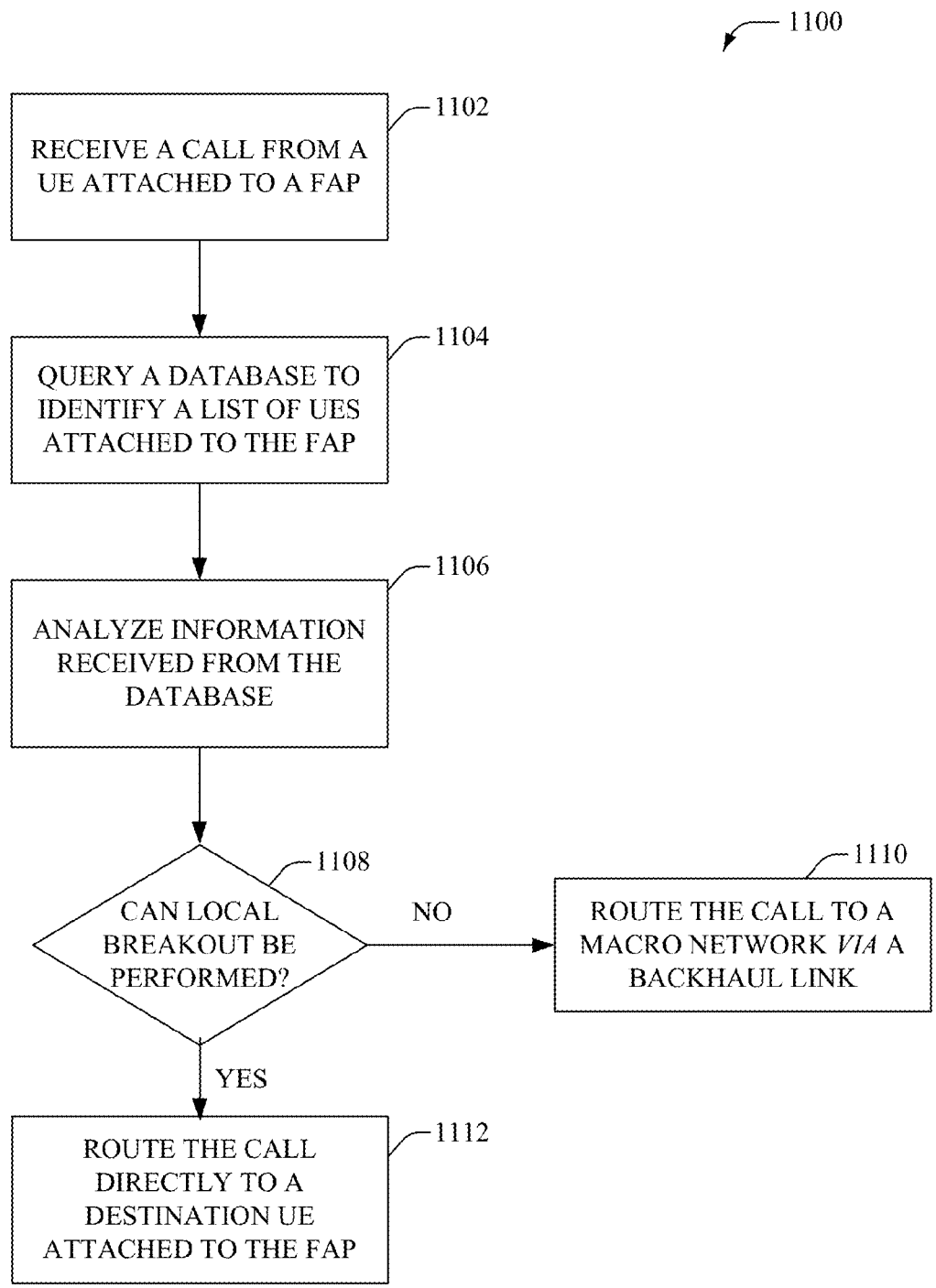
FIG. 11 illustrates an example methodology that facilitates UE-to-UE CS media breakout, according to an aspect of the subject disclosure.

Referring to FIG. 11, there illustrated is an example methodology 1100 that facilitates UE-to-UE CS media breakout, according to an aspect of the subject disclosure. At 1102, a call can be received from a UE attached to a femto AP. At 1104, a database can be queried to identify a list of UEs attached to the femto AP. As an example, the database can be local, remote and/or distributed, and can provide a list of UEs currently attached to the femto AP based on information, such as, but not limited to, device ID, SIM, USIM, a mobile number, etc., associated with the UEs. At 1106, information received from the database can be analyzed. In addition, data, such as, but not limited to, the received traffic, PDFs, PEFs, user preferences, network provider preferences, UE parameters, femto AP parameters, can also be analyzed.

At 1108, it can be determined whether local breakout can be performed, based in part on the analysis. At 1110, the call can be routed to a macro network via a backhaul link, when determined that local breakout cannot be performed. For example, the call can be directed to the called party via the macro network when determined that the called party is not attached to the femto AP. Alternately, at 1112, the call can be routed to a destination UE attached to the femto AP, when determined that local breakout can be performed. It can be appreciated that the core network can be informed of the local breakout of the CS call by transmitting data to the core network associated with the call. As an example, the data can be utilized for billing, accounting, records, etc.

Figure 12:
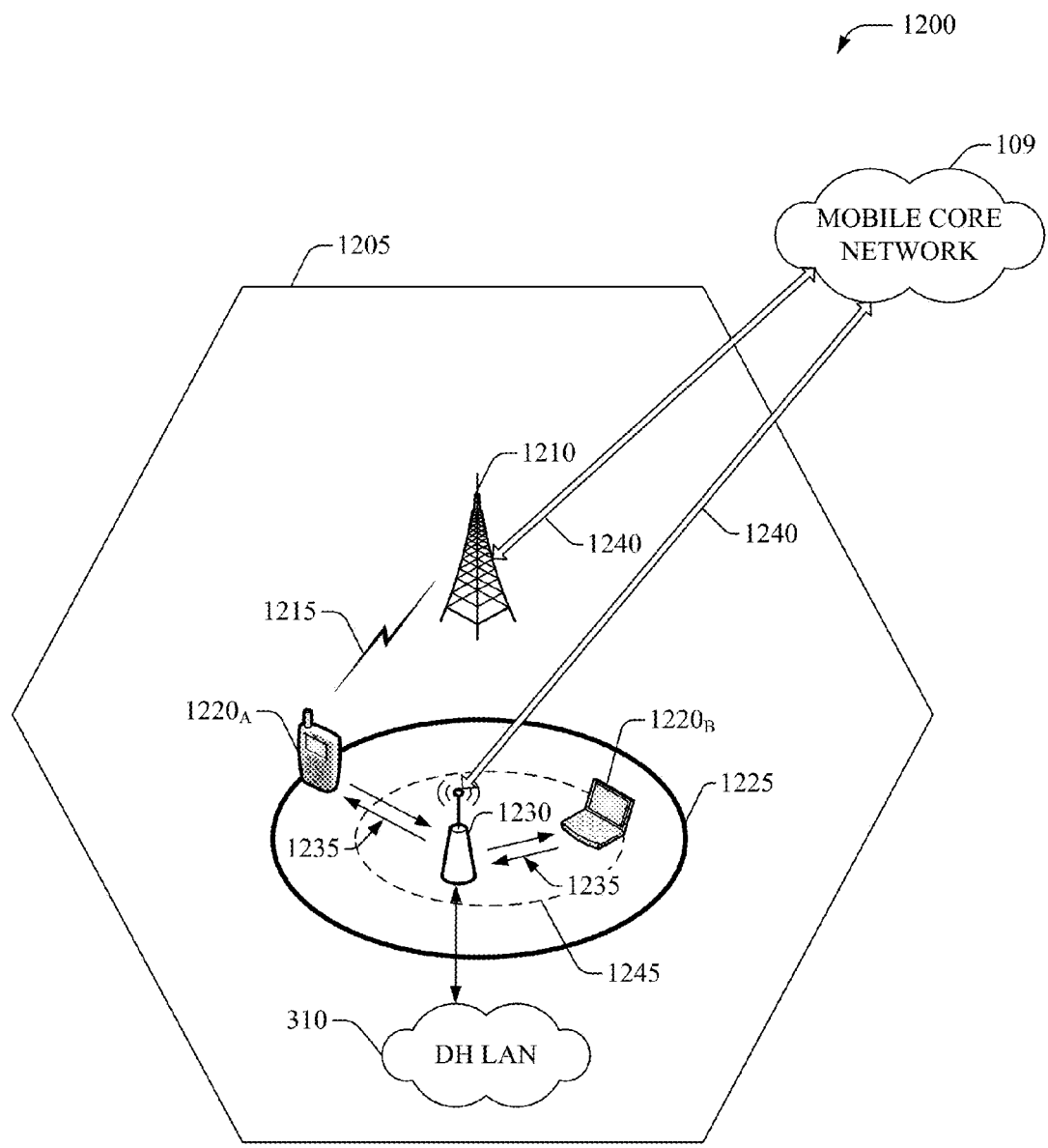
FIG. 12 illustrates an example wireless communication environment with associated components for operation of a femtocell in accordance with the subject specification.

FIG. 12 illustrates a schematic wireless environment 1200 (e.g., a network) in which a femtocell can exploit various aspects of the subject innovation in accordance with the disclosed subject matter. In wireless environment 1200, area 1205 can represent a coverage macro cell, which can be served by base station 1210. Macro coverage is generally intended for outdoors locations for servicing mobile wireless devices, like UE $1220_A$, and such coverage is achieved via a wireless link 1215. In an aspect, UE 1220 can be a 3GPP Universal Mobile Telecommunication System (UMTS) mobile phone.

Within macro coverage cell 1205, a femtocell 1245, served by a femto access point 1230, can be deployed. A femtocell typically can cover an area 1225 that is determined, at least in part, by transmission power allocated to femto AP 1230, path loss, shadowing, and so forth. Coverage area typically can be spanned by a coverage radius that ranges from 20 to 50 meters. Confined coverage area 1245 is generally associated with an indoors area, or a building, which can span about 5000 sq. ft. Generally, femto AP 1230 typically can service a number (e.g., a few or more) wireless devices (e.g., subscriber station $1220_B$) within confined coverage area 1245. In an aspect, femto AP 1230 can integrate seamlessly with substantially any PS-based and CS-based network; for instance, femto AP 1230 can integrate into an existing 3GPP Core via conventional interfaces like Iu-CS, Iu-PS, Gi, Gn. In another aspect, femto AP 1230 can exploit high-speed downlink packet access in order to accomplish substantive bitrates. In yet another aspect, femto AP 1230 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE $1220_A$, leaves macro coverage (e.g., cell 1205) and enters femto coverage (e.g., area 1215), as illustrated in environment 1200, UE $1220_A$ can attempt to attach to the femto AP 1230 through transmission and reception of attachment signaling, effected via a FL/RL 1235; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 1220 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes femto AP 1230) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if not successful, UE 1220 generally can be commanded (through a variety of communication means) to select another LAC/RAC or enter "emergency calls only" mode. It is to be appreciated that this attempt and handling process can occupy significant UE battery, and femto AP capacity and signaling resources as well.

When an attachment attempt is successful, UE 1220 can be allowed on femtocell 1225 and incoming voice and data traffic can be paged and routed to the subscriber station through the femto AP 1230. It is to be noted also that data traffic is typically routed through a backhaul broadband wired network backbone 1240 (e.g., optical fiber backbone, twisted-pair line, T1/E1 phone line, DSL, or coaxial cable). It is to be noted that as a femto AP 1230 generally can rely on a backhaul network backbone 1240 for routing and paging, and for packet communication, substantially any quality of service can handle heterogeneous packetized traffic. Namely, packet flows established for wireless communication devices (e.g., terminals $1220_A$ and $1220_B$) served by femto AP 1230, and for devices served through the backhaul network pipe 1240. It is to be noted that to ensure a positive subscriber experience, or perception, it is desirable for femto AP 1230 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femto coverage area (e.g., area 1225 or area 1245).

It can be appreciated that the femto AP 1230 can be substantially similar to FAP 104 and include functionality, more fully described herein, for example, with respect to systems 100-700. In particular, femto AP 1230 can include a routing component that can utilize one or more local breakout mechanisms to facilitate efficient routing of traffic, for example, between UE ($1220_A$ and $1220_B$), DH LAN 310, and/or base station 1210 via backhaul broadband wired network backbone 1240

Figure 13:
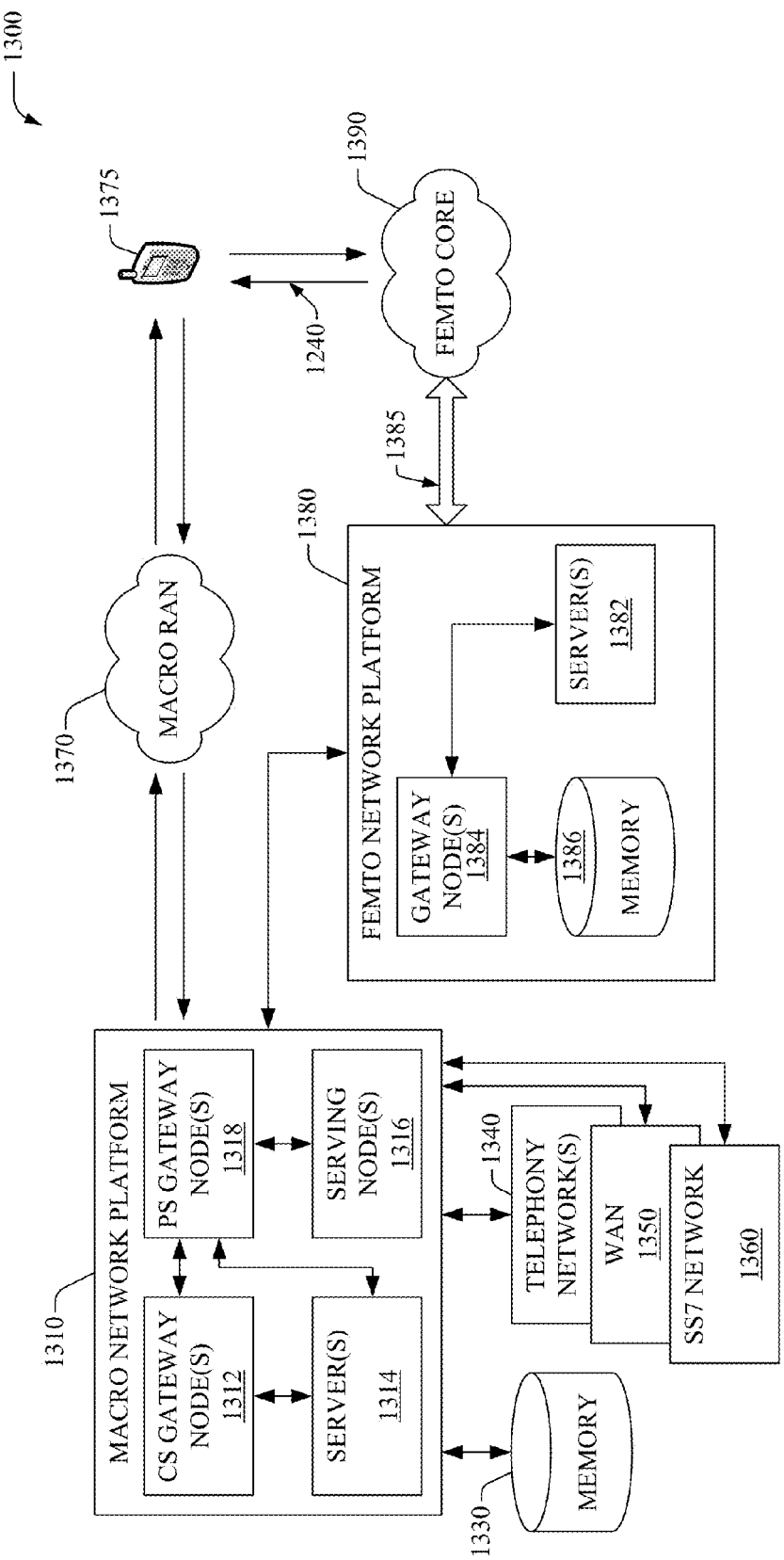
FIG. 13 illustrates a schematic deployment of a macro cell and a femtocell for wireless coverage in accordance with aspects of the disclosure.
Figure 14:
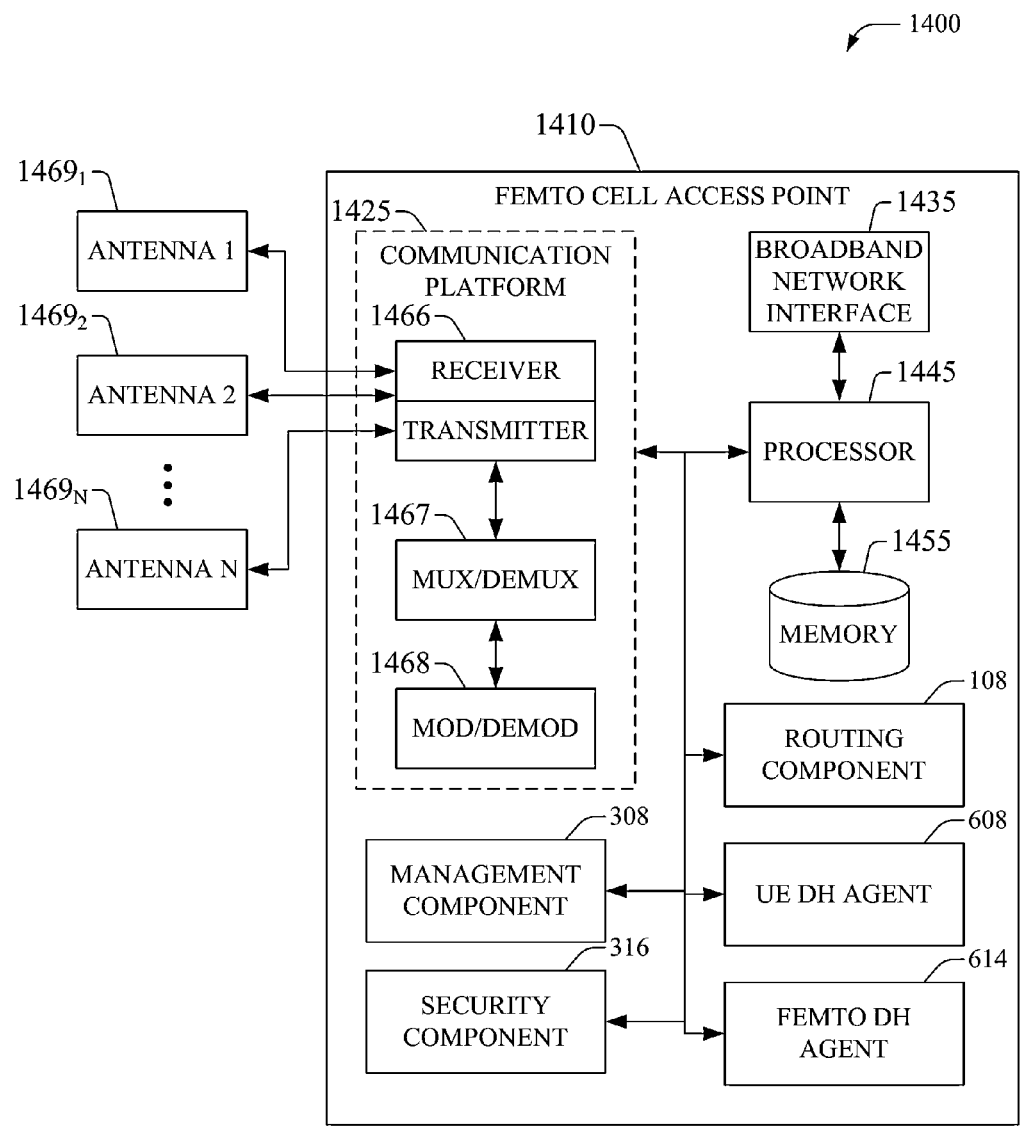
FIG. 14 illustrates an example embodiment of a femto access point that can facilitate local breakout, according to the subject disclosure.

To provide further context for various aspects of the subject specification, FIGS. 13 and 14 illustrate, respectively, an example wireless communication environment 1300, with associated components for operation of a femtocell, and a block diagram of an example embodiment 1400 of a femto access point, which can facilitate local breakout at a femtocell in accordance with aspects described herein.

Wireless communication environment 1300 includes two wireless network platforms: (i) A macro network platform 1310 that serves, or facilitates communication) with user equipment 1375 via a macro radio access network (RAN) 1370. It should be appreciated that in cellular wireless technologies (e.g., 3GPP UMTS, HSPA, 3GPP LTE, 3GPP UMB), macro network platform 1310 is embodied in a Core Network. (ii) A femto network platform 1380, which can provide communication with UE 1375 through a femto RAN 1390 linked to the femto network platform 1380 via backhaul pipe(s) 1385, wherein backhaul pipe(s) are substantially the same a backhaul link 1240. It should be appreciated that femto network platform 1380 typically offloads UE 1375 from macro network, once UE 1375 attaches (e.g., through macro-to-femto handover, or via a scan of channel resources in idle mode) to femto RAN. It is noted that RAN includes base station(s), or access point(s), and its associated electronic circuitry and deployment site(s), in addition to a wireless radio link operated in accordance with the base station(s). Accordingly, macro RAN 1370 can comprise various coverage cells like cell 1205, while femto RAN 1390 can comprise multiple femtocell access points. As mentioned above, it is to be appreciated that deployment density in femto RAN 1390 is substantially higher than in macro RAN 1370.

Generally, both macro and femto network platforms 1310 and 1380 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1310 includes CS gateway node(s) 1312 which can interface CS traffic received from legacy networks like telephony network(s) 1340 (e.g., public switched telephone network (PSTN), or public land mobile network (PLMN)) or a SS7 network 1360. Moreover, CS gateway node(s) 1312 interfaces CS-based traffic and signaling and gateway node(s) 1318.

In addition to receiving and processing CS-switched traffic and signaling, gateway node(s) 1318 can authorize and authenticate PS-based data sessions with served (e.g., through macro RAN) wireless devices. Data sessions can include traffic exchange with networks external to the macro network platform 1310, like wide area network(s) (WANs) 1350; it should be appreciated that local area network(s) (LANs) can also be interfaced with macro network platform 1310 through gateway node(s) 1318. Gateway node(s) 1318 generates packet data contexts when a data session is established. It should be further appreciated that the packetized communication can include multiple flows that can be generated through server(s) 1314. Macro network platform 1310 also includes serving node(s) 1316 that convey the various packetized flows of information, or data streams, received through gateway node(s) 1318. It is to be noted that server(s) 1314 can include one or more processor configured to confer at least in part the functionality of macro network platform 1310. To that end, the one or more processor can execute code instructions stored in memory 1330, for example.

In example wireless environment 1300, memory 1330 stores information related to operation of macro network platform 1310. Information can include business data associated with subscribers; market plans and strategies, e.g., promotional campaigns, business partnerships; operational data for mobile devices served through macro network platform; service and privacy policies; end-user service logs for law enforcement; and so forth. Memory 1330 can also store information from at least one of telephony network(s) 1340, WAN(s) 1350, or SS7 network 1360.

Femto gateway node(s) 1384 have substantially the same functionality as PS gateway node(s) 1318. Additionally, femto gateway node(s) 1384 can also include substantially all functionality of serving node(s) 1316. In an aspect, femto gateway node(s) 1384 facilitates handover resolution, e.g., assessment and execution. Server(s) 1382 have substantially the same functionality as described in connection with server(s) 1314 and can include one or more processor configured to confer at least in part the functionality of macro network platform 1310. To that end, the one or more processor can execute code instructions stored in memory 1386, for example.

Memory 1386 can include information relevant to operation of the various components of femto network platform 1380. For example operational information that can be stored in memory 1386 can comprise, but is not limited to, subscriber information; contracted services; maintenance and service records; femtocell configuration (e.g., devices served through femto RAN 1390; access control lists, or white lists); service policies and specifications; privacy policies; add-on features; and so forth With respect to FIG. 14, in example embodiment 1400, femtocell AP 1410 can receive and transmit signal(s) (e.g., traffic and control signals) from and to wireless devices, access terminals, wireless ports and routers, etc., through a set of antennas $1469_1$-$1469_N$. It should be appreciated that while antennas $1469_1$-$1469_N$ are a part of communication platform 1425, which comprises electronic components and associated circuitry that provides for processing and manipulating of received signal(s) (e.g., a packet flow) and signal(s) (e.g., a broadcast control channel) to be transmitted. In an aspect, communication platform 1425 includes a transmitter/receiver (e.g., a transceiver) 1466 that can convert signal(s) from analog format to digital format upon reception, and from digital format to analog format upon transmission. In addition, receiver/transmitter 1466 can divide a single data stream into multiple, parallel data streams, or perform the reciprocal operation. Coupled to transceiver 1466 is a multiplexer/demultiplexer 1467 that facilitates manipulation of signal in time and frequency space. Electronic component 1467 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1467 can scramble and spread information (e.g., codes) according to substantially any code known in the art; e.g., Hadamard-Walsh codes, Baker codes, Kasami codes, polyphase codes, and so on. A modulator/demodulator 1468 is also a part of operational group 1425, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 1410 also includes a processor 1445 configured to confer functionality, at least partially, to substantially any electronic component in the femto access point 1410, in accordance with aspects of the subject innovation. In particular, processor 1445 can facilitate femto AP 1410 to implement configuration instructions received through communication platform 1425, which can include storing data in memory 1455. In addition, processor 1445 facilitates femto AP 1410 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1445 can manipulate antennas $1469_1$-$1469_N$ to facilitate beamforming or selective radiation pattern formation, which can benefit specific locations (e.g., basement, home office . . . ), covered by femto AP; and exploit substantially any other advantages associated with smart-antenna technology. Memory 1455 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1455 can store configuration information such as schedules and policies; femto AP address(es) or geographical indicator(s); access lists (e.g., white lists); license(s) for utilization of add-features for femto AP 1410, and so forth.

In embodiment 1400, processor 1445 is coupled to the memory 1455 in order to store and retrieve information necessary to operate and/or confer functionality to communication platform 1425, broadband network interface 1335 (e.g., a broadband modem), and other operational components (e.g., multimode chipset(s), power supply sources . . . ; not shown) that support femto access point 1410. The femto AP 1410 can further include a routing component 108, management component 308, security component 316, UE DH agent 608, femto DH agent 614, which can include functionality, as more fully described herein, for example, with regard to systems 100-700. In addition, it is to be noted that the various aspects disclosed in the subject specification can also be implemented through (i) program modules stored in a computer-readable storage medium or memory (e.g., memory 1386 or memory 1455) and executed by a processor (e.g., processor 1445), or (ii) other combination(s) of hardware and software, or hardware and firmware.

Figure 15:
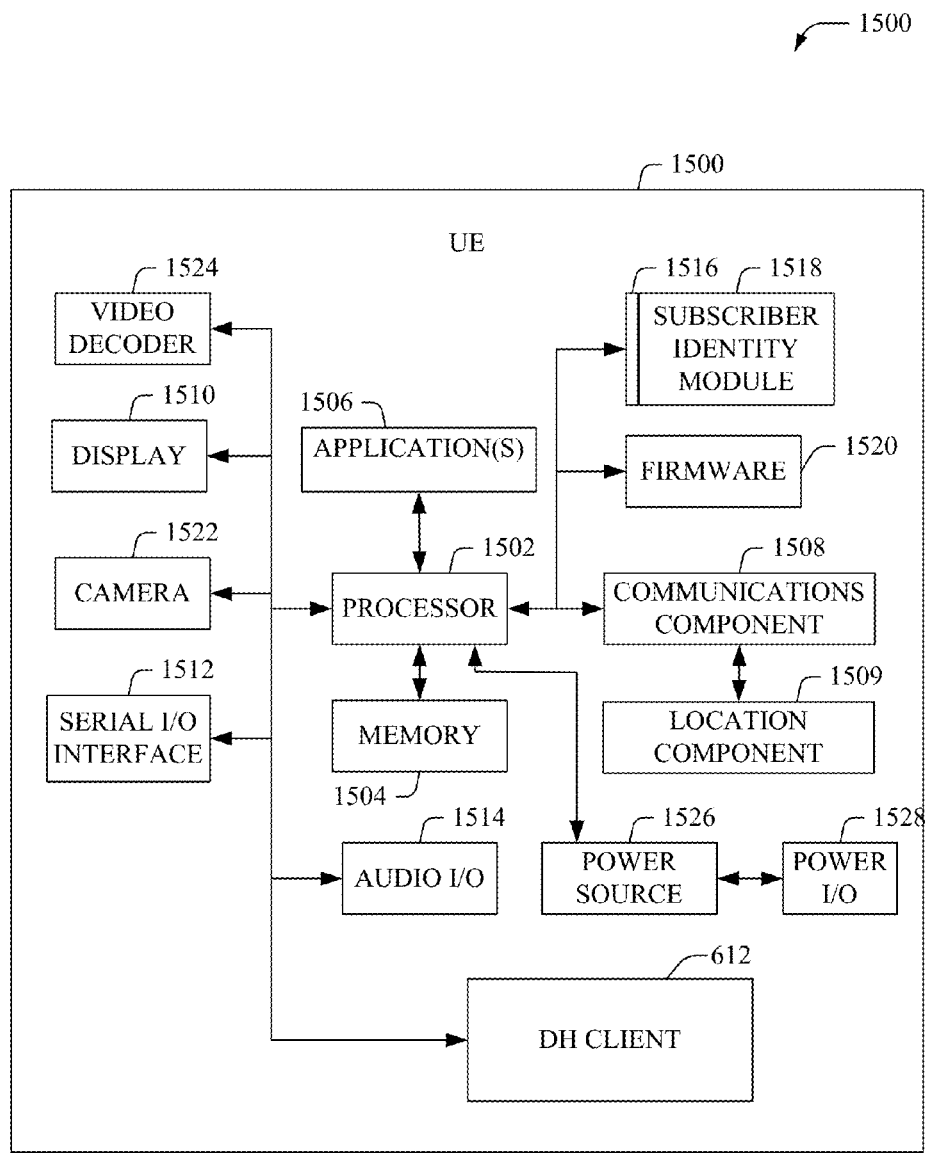
FIG. 15 illustrates a block diagram of a UE suitable for communication with a DH LAN via a femto network in accordance with the innovation.

Referring now to FIG. 15, there is illustrated a block diagram of a UE 1500 suitable for communication with a DH LAN via a femto network in accordance with the innovation. The UE 1500 can include a processor 1502 for controlling all onboard operations and processes. A memory 1504 can interface to the processor 1502 for storage of data and one or more applications 1506 being executed by the processor 1502. A communications component 1508 can interface to the processor 1502 to facilitate wired/wireless communication with external systems (e.g., femtocell and macro cell). The communications component 1508 interfaces to a location component 1509 (e.g., GPS transceiver) that can facilitate location detection of the UE 1500. Note that the location component 1509 can also be included as part of the communications component 1508.

The UE 1500 can include a display 1510 for displaying content downloaded and/or for displaying text information related to operating and using the device features. A serial I/O interface 1512 is provided in communication with the processor 1502 to facilitate serial communication (e.g., USB, and/or IEEE 1394) via a hardwire connection. Audio capabilities are provided with an audio I/O component 1514, which can include a speaker for the output of audio signals related to, for example, recorded data or telephony voice data, and a microphone for inputting voice signals for recording and/or telephone conversations.

The device 1500 can include a slot interface 1516 for accommodating a subscriber identity module (SIM) 1518. Firmware 1520 is also provided to store and provide to the processor 1502 startup and operational data. The UE 1500 can also include an image capture component 1522 such as a camera and/or a video decoder 1524 for decoding encoded multimedia content. The UE 1500 can also include a power source 1526 in the form of batteries, which power source 1526 interfaces to an external power system or charging equipment via a power I/O component 1528. In addition, the UE 1500 can include a DH client 612 that facilitates communication between UE 1500 and home network via a femto AP. The DH client 612 can include functionality, as more fully described herein, for example, with regard to system 600.

Figure 16:
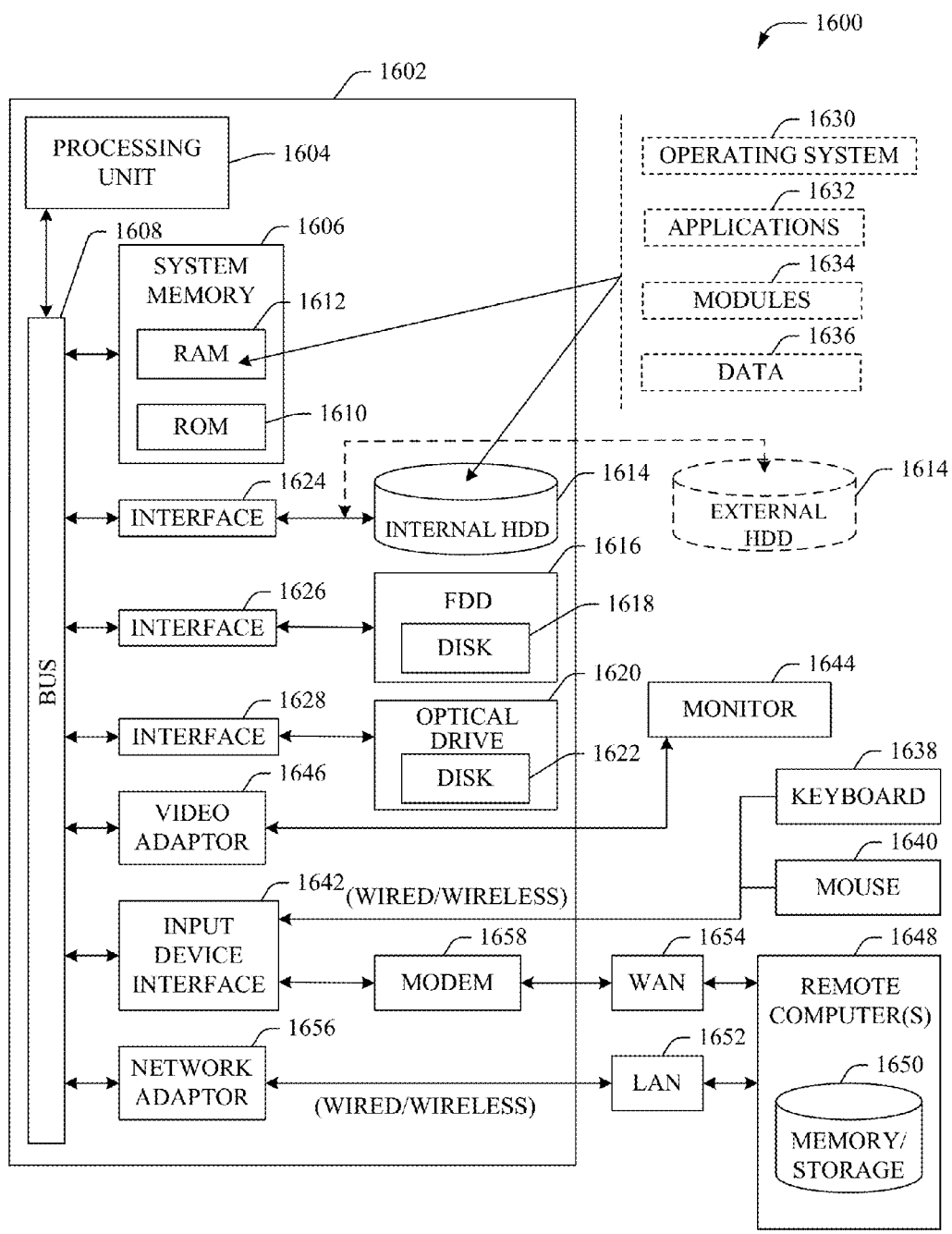
FIG. 16 illustrates a block diagram of a computer operable to execute the disclosed communication architecture.

Referring now to FIG. 16, there is illustrated a block diagram of a computer operable to execute the disclosed communication architecture. In order to provide additional context for various aspects of the subject specification, FIG. 16 and the following discussion are intended to provide a brief, general description of a suitable computing environment 1600 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 16, the example environment 1600 for implementing various aspects of the specification includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes read-only memory (ROM) 1610 and random access memory (RAM) 1612. A basic input/output system (BIOS) is stored in a non-volatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 can also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is appreciated that the specification can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices (not shown) can include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 can operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 is connected to the local network 1652 through a wired and/or wireless communication network interface or adapter 1656. The adapter 1656 can facilitate wired or wireless communication to the LAN 1652, which can also include a wireless access point disposed thereon for communicating with the wireless adapter 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the serial port interface 1642. In a networked environment, program modules depicted relative to the computer 1602, or portions thereof, can be stored in the remote memory/storage device 1650. It will be appreciated that the network connections shown are example and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A femto access point device, comprising:
   a memory to store executable instructions; and
   a processor, coupled to the memory, that facilitates execution of the executable instructions to perform operations, comprising:
      in response to receiving communication data from a user equipment that is coupled to the femto access point device, selecting, based on source address data indicative of a source device associated with the communication data, routing data that represents a route via which the communication is to be routed, wherein the selecting comprises selecting between a first route that directs the communication data to a network device of a wide area network via a local area network device coupled to the femto access point device and a second route that directs the communication data to the network device via a macro network device coupled to the femto access point device,
      in response to receiving instruction data indicative of an instruction to override local breakout, disabling local breakout functionality performed via the femto access point device, wherein the communication data is directed to the network device via the second route in response to the disabling, and
      based on the routing data, facilitating a transmission of the communication data to the network device.

2. The femto access point device of claim 1, wherein the selecting further comprises selecting the routing data based on protocol data indicative of a protocol associated with the communication data.

3. The femto access point device of claim 1, wherein the selecting further comprises selecting the routing data based on subscriber policy data associated with the user equipment.

4. The femto access point device of claim 1, wherein the selecting further comprises selecting the routing data based on preference data stored in a data store of the femto access point device.

5. The femto access point device of claim 1, wherein the instruction data comprises timing data that specifies a time period during which the local breakout functionality is to be disabled.

6. The femto access point device of claim 1, wherein the selecting further comprises selecting the routing data based on an analysis of a cost of the communication data being transmitted via a specified route relative to a benefit of the communication data being transmitted via the specified route.

7. The femto access point device of claim 1, wherein the selecting further comprises selecting the routing data based on information representing a load balancing policy.

8. The femto access point device of claim 1, wherein the operations further comprise:
   determining the source address data based on an analysis of header data associated with the communication data.

9. The femto access point device of claim 1, wherein the selecting further comprises selecting the routing data based on policy decision information received via the macro network device.

10. The femto access point device of claim 1, wherein the selecting further comprises selecting the routing data based on policy enforcement information received via the macro network device.

11. The femto access point device of claim 10, wherein the operations further comprise:
    receiving, from a femto management platform device, the policy enforcement information during provisioning of the femto access point device.

12. The femto access point device of claim 1, wherein the communication data comprises a set of data packets and the selecting comprises selecting the routing data based on type data indicative of a type of the set of the data packets.

13. A method, comprising:
    receiving, by a femto access point device comprising a processor, communication data from a user equipment that is coupled to the femto access point device;
    based on source address data indicative of a source device associated with the communication data, determining, by the femto access point device, routing data indicative of a route via which the communication data is to be transmitted, wherein the determining comprises selecting between a first route that directs the communication data to a network device of a wide area network via a local area network device that is coupled to the femto access point device, and a second route that directs the communication data to the network device via a macro network device that is coupled to the femto access point device; and
    in response to receiving instruction data indicative of an instruction to override local breakout, disabling, by the femto access point device, local breakout functionality performed via the femto access point device, wherein the communication data is directed to the network device via the second route in response to the disabling.

14. The method of claim 13, further comprising:
    based on the routing data, directing, by the femto access point, the communication data, to the network device.

15. The method of claim 13, wherein the determining comprises determining the routing data based on protocol data indicative of a protocol associated with the communication data.

16. The method of claim 13, wherein the determining comprises determining the routing data
    based on load balancing between a first network load associated with the first route and a second network load associated with the second route.

17. The method of claim 13, further comprising:
    during a provisioning of the femto access point device, receiving, by the femto access point device, policy enforcement information from a femto management platform device, wherein the determining comprises determining the routing data based on the policy enforcement information.

18. A computer-readable storage device comprising executable instructions that, in response to execution, cause a femto access point device comprising a processor to perform operations, comprising:
    determining source address data indicative of a source device associated with communication data received from a user equipment that is coupled to a femto access point device via a wireless interface;
    based on the source address data, determining routing data representing a route via which the communication data is to be transmitted, wherein the determining the routing data comprises selecting between a first route that directs the communication data to a network device of a wide area network via a local area network device that is coupled to the femto access point device, and a second route that directs the communication data to the network device via a macro network device that is coupled to the femto access point device; and
    in response to receiving instruction data indicative of an instruction to override local breakout, disabling local breakout functionality performed by the femto access point device, wherein the communication data is directed to the network device via the second route in response to the disabling.

19. The computer-readable storage device of claim 18, wherein the determining the source address comprises analyzing a packet header of the communication data.

20. The computer-readable storage device of claim 18, wherein the operations further comprise:
    receiving, from the user equipment, preference data, wherein the determining the routing data comprises determining the routing data based on the preference data.

* * * * *